(12) United States Patent
Yaguchi

(10) Patent No.: US 12,365,834 B2
(45) Date of Patent: Jul. 22, 2025

(54) METHOD OF SUBSTITUTING LIGANDS

(71) Applicant: SHARP KABUSHIKI KAISHA, Sakai (JP)

(72) Inventor: Yuma Yaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/290,921

(22) PCT Filed: Sep. 30, 2021

(86) PCT No.: PCT/JP2021/036046
§ 371 (c)(1),
(2) Date: Jan. 22, 2024

(87) PCT Pub. No.: WO2023/053312
PCT Pub. Date: Apr. 6, 2023

(65) Prior Publication Data
US 2024/0343971 A1 Oct. 17, 2024

(51) Int. Cl.
*C09K 11/06* (2006.01)

(52) U.S. Cl.
CPC ......... *C09K 11/06* (2013.01); *C09K 2211/10* (2013.01); *C09K 2211/1007* (2013.01)

(58) Field of Classification Search
CPC ................................ H05B 33/10; H05B 33/14
See application file for complete search history.

(56) References Cited

U.S. PATENT DOCUMENTS

2021/0163771 A1  6/2021  Haben et al.

FOREIGN PATENT DOCUMENTS

CN    109385279 A  *  2/2019  .......... C09K 11/883
WO    2019/203240 A1    10/2019

* cited by examiner

*Primary Examiner* — Khanh T Nguyen
(74) *Attorney, Agent, or Firm* — ScienBiziP, P.C.

(57) ABSTRACT

First ligands coordinated to nanoparticles are replaced by monodentate second ligands that, when coordinated to the nanoparticles, render the nanoparticles non-dispersible in a solvent, and the nanoparticles to which the second ligands are coordinated are separated out as a first solid content by solid-liquid separation. Thereafter, the second ligands are replaced by desirable target ligands by adding, to the first solid content, a second ligand solution containing the target ligands and a third organic solvent.

13 Claims, 5 Drawing Sheets

METHOD OF SUBSTITUTING LIGANDS

TECHNICAL FIELD

The present disclosure relates to methods of substituting ligands (ligand exchange methods) on the surfaces of nanoparticles.

BACKGROUND ART

Quantum dots, carrier-transportable inorganic nanoparticles, and other like nanoparticles are used in various fields including light-emitting elements, solar cells, and wavelength converters. These nanoparticles are commercially available, for example, in the form of a nanoparticle-dispersed solution containing the nanoparticles. The nanoparticles are synthesized by, for example, a wet process in which the particle diameters of the nanoparticles are controlled by coordinating ligands to the surfaces of the nanoparticles (surface modification). The ligands also serve as a dispersant to improve the dispersibility of the nanoparticles. The ligands are used also to improve the surface stability and storage stability of the nanoparticles.

A nanoparticle film of these nanoparticles is typically formed by applying and drying a nanoparticle-dispersed solution containing the nanoparticles. Therefore, to disperse synthesized or commercially available ligand-coordinated nanoparticles in a given solvent, the ligands coordinated to the nanoparticles need to be replaced by ligands that are suited to the solvent to be used.

In addition, the chemical properties required in the ligands used in the synthesis or storage of nanoparticles are in some cases different from chemical properties required in the use of the nanoparticles. In such cases, the ligands coordinated to the nanoparticles need to be replaced by ligands that are suited to the usage of the nanoparticles.

For instance, Patent Literature 1 discloses use of a first solvent containing nanoparticles having surfaces to which first ligands are bound and a second solvent containing nanoparticles having surfaces to which second ligands are bound, the second solvent being immiscible to the first solvent, in forming nanoparticles having surfaces to which the second ligands are bound. Patent Literature 1 further discloses that the first solvent is, for example, at least one species selected from the group consisting of 1-octadecene, toluene, and hexane and that the second solvent is, for example, at least one species selected from the group consisting of water, PEGMEA (propylene glycol monomethyl ether acetate), and ethanol.

CITATION LIST

Patent Literature

Patent Literature 1: PCT International Application Publication No. WO2019/203240

SUMMARY

Technical Problem

As in this example, ligand exchange is generally performed by phase separation using a solvent with an opposite polarity.

Such ligand exchange produces a liquid phase (first solvent phase) containing nanoparticles having surfaces to which the second ligands are bound and a liquid phase (second solvent phase) containing the first ligands. The first solvent phase and the second solvent phase therefore need to be subjected to liquid-liquid separation to isolate the nanoparticles having surfaces to which the second ligands are bound.

This separation of two liquid phases (liquid phase separation) is difficult and laborious. In addition, completely separating two liquid phases is so difficult that a rinsing process needs to be repeated to remove the first ligands. The nanoparticles are hence subject to degradation.

Especially, when the ligands coordinated to the nanoparticles and the ligands to be substituted are mutually miscible solvents of the same polarity (e.g., when both solvents are either non-polar or polar), ligand exchange needs to be performed twice.

For instance, when the nanoparticles are quantum dots, many quantum dots are hardly dispersible in polar solvents and easily dispersible in non-polar solvents. To replace the ligands (first ligands) coordinated to the quantum dots dispersed in a non-polar solvent with other ligands that are suited to have the quantum dots dispersed in a non-polar solvent, first of all, the first ligands are temporarily replaced by ligands (intermediate ligands) that are suited to have the quantum dots dispersed in a polar solvent (typically, water). Thereafter, these intermediate ligands are replaced by the ligands to be ultimately substituted (target ligands) that are suited to have the quantum dots dispersed in the non-polar solvent. This technique involves two ligand exchanges each of which requires liquid-liquid separation.

As described here, solvents with opposite polarities are used before and after ligand exchange. If both the first ligands and the target ligands, when coordinated to nanoparticles, are such as to allow the nanoparticles to be dispersed in solvents of the same polarity, direct ligand exchange of the target ligands for the first ligands is impossible. Therefore, to substitute given target ligands for the first ligands, liquid-liquid separation needs to be performed once or more, depending on, for example, the polarity of each solvent in which the nanoparticles to which ligands are coordinated are dispersed.

Meanwhile, when the nanoparticles are quantum dots as described above, the polar solvent is typically water or a water-containing, aqueous solvent such as a mix solvent that is a combination of water and another solvent (e.g., alcoholic polar solvent). For example, Patent Literature 1 discloses separating the reaction solution obtained by ligand exchange into two phases, that is, an aqueous phase and an organic solvent phase. However, quantum dots are susceptible to degradation in water. Degradation of nanoparticles can cause, for example, degradation of properties such as decreases in quantum yield and degradation of luminescence properties.

The present disclosure, in an aspect thereof, has been made in view of these issues and has an object to provide a ligand exchange method capable of substituting desirable target ligands without having to use an aqueous solvent or having to perform liquid-liquid separation and also of better restraining degradation of nanoparticles in ligand exchange than known ligand exchange methods.

Solution to Problem

To address these issues, the present disclosure, in an aspect thereof, is directed to a method of substituting ligands, the method including: a first ligand exchange step of replacing first ligands with second ligands by mixing a first nanoparticle-dispersed solution containing nanoparticles, the first ligands, and a first organic solvent with a first ligand solution containing a second organic solvent and the monodentate, second ligands that, by being coordinated to the nanoparticles, render the nanoparticles non-dispersible in a solvent; a first separation step of separating, as a first solid content, the nanoparticles to which the second ligands are coordinated from a liquid phase by solid-liquid separation; a second ligand exchange step of replacing the second ligands with desirable target ligands by adding a second ligand solution containing the target ligands and a third organic solvent to the first solid content; a second separation step of isolating, as a second solid content, the nanoparticles to which the target ligands are coordinated; and a redispersion step of dispersing, in a fourth organic solvent, the nanoparticles to which the target ligands are coordinated and that are isolated in the second separation step.

Advantageous Effects of Disclosure

The present disclosure, in an aspect thereof, provides a ligand exchange method capable of substituting desirable target ligands without having to use an aqueous solvent or having to perform liquid-liquid separation and also of better restraining degradation of nanoparticles in ligand exchange than known ligand exchange methods.

DESCRIPTION OF EMBODIMENTS

Figure 1:
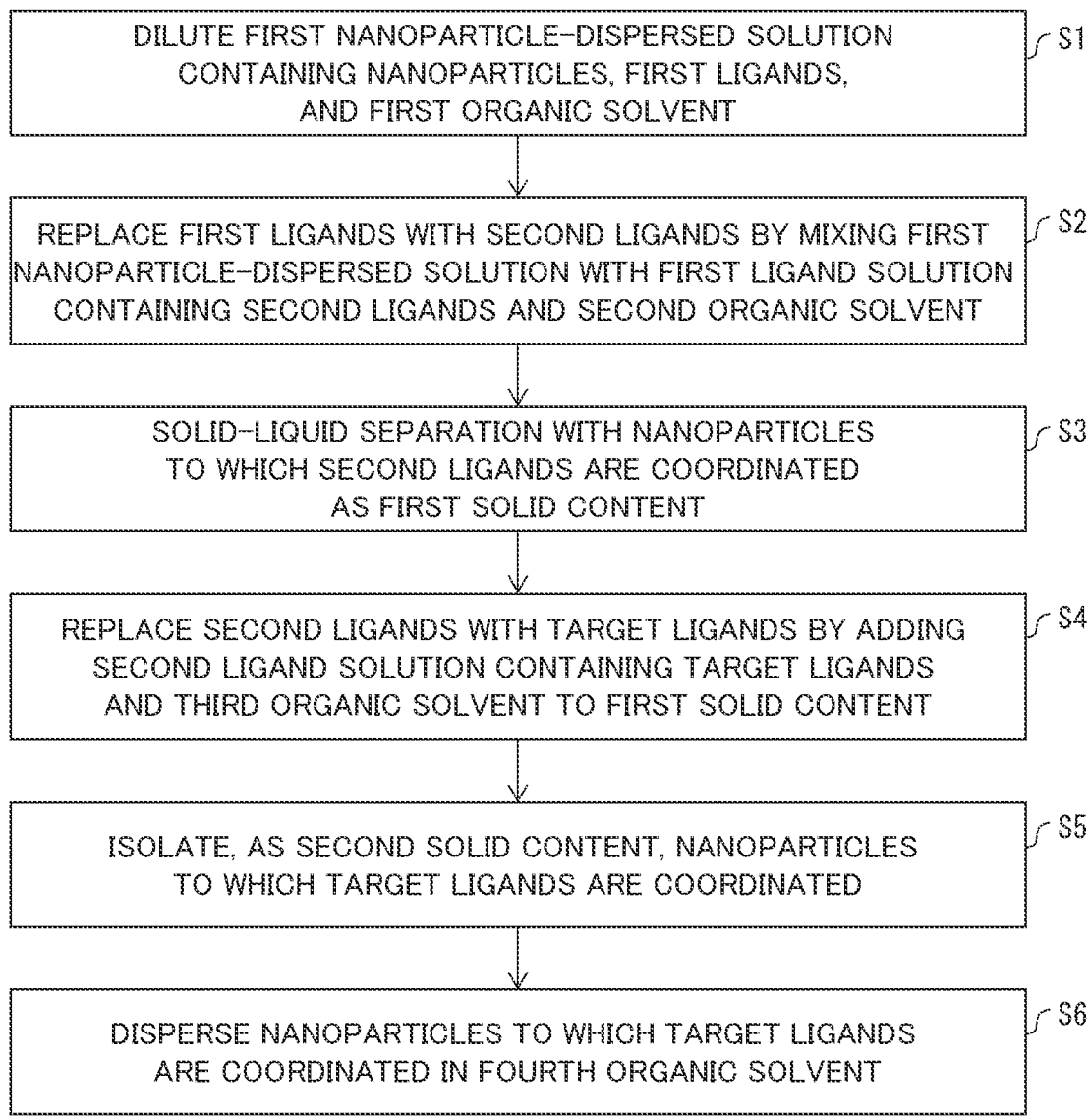
FIG. 1 is a flow chart representing a ligand exchange method in accordance with an embodiment in the order of steps involved.

The following will describe an embodiment of the present disclosure in detail. Note that throughout the following description, the language, "from A to B," where A and B are both numerical values, refers to "greater than or equal to A and less than or equal to B" unless otherwise mentioned.

The ligand exchange method in accordance with the present embodiment is a ligand exchange method of substituting desirable target ligands for the ligands (first ligands) coordinated to nanoparticles contained in a given nanoparticle-dispersed solution (first nanoparticle-dispersed solution) without having to use an aqueous solvent or having to perform liquid-liquid separation. Note that the target ligands in the current context refers to given ligands that are ultimately substituted. The target ligands are capable of having the nanoparticles dispersed in a desirable organic solvent.

If both the first ligands and the target ligands, when coordinated to nanoparticles, are such as to allow the nanoparticles to be dispersed in solvents of the same polarity, direct ligand exchange of the target ligands for the first ligands is impossible. Therefore, as described above, to substitute given target ligands for the first ligands coordinated to nanoparticles contained in a given nanoparticle-dispersed solution, the first ligands need to be temporarily replaced by intermediate ligands that are subsequently replaced by the target ligands.

Note that the "intermediate ligands" in the current context refers to the ligands that are temporarily substituted to ultimately replace the first ligands with the target ligands. Substituting the target ligands ultimately for the first ligands ultimately produces the desirable nanoparticle-dispersed solution in which the nanoparticles are dispersed in the desirable organic solvent (target solvent). In addition, the "target solvent" refers to the arbitrary organic solvent in which the nanoparticles to which the target ligands are coordinated are ultimately dispersed.

In the present embodiment, the intermediate ligands are monodentate ligands (second ligands) that, when coordinated to the nanoparticles, remarkably reduce the dispersibility of the nanoparticles in any solvent. When the first ligands are replaced by the second ligands, the nanoparticles are no longer dispersible in solvents. In other words, the second ligands used in the present embodiment render the nanoparticles non-dispersible in solvents by being coordinated to the nanoparticles.

Note that in the present embodiment, "dispersed" refers to the nanoparticles being dispersed in a colloidal form. In addition, the "dispersed solution" refers to the "colloidal solution."

In addition, in the present embodiment, "coordinated" refers to the ligands adsorbing onto the surfaces of the nanoparticles (in other words, the ligands modifying the surfaces of the nanoparticles (surface modification)). Note that "adsorb" in the current context refers to the ligands exhibiting a higher concentration on the surfaces of the nanoparticles than in the surroundings. This adsorption may be chemical adsorption that involves chemical bonds between the nanoparticles and the ligands and may be either physical adsorption or electrostatic adsorption. The ligands may form, for example, coordinate bonds, covalent bonds, ionic bonds, or hydrogen bonds so long as the adsorption has chemical effects on the surfaces of the nanoparticles and may involve no bonding. In addition, in the present embodiment, the "ligands" refers not only to the molecules and ions coordinated to the surfaces of the nanoparticles, but comprehensively to the molecules and ions that can be coordinated, but are not coordinated, to the surfaces of the nanoparticles.

In the present embodiment, as described above, the nanoparticles to which the second ligands are coordinated are subjected to solid-liquid separation to substitute the target ligands, by utilizing the fact that the nanoparticles to which the second ligands are coordinated are not dispersible in any solvent. It is hence possible to replace the first ligands coordinated to the nanoparticles contained in the first nanoparticle-dispersed solution with the desirable target ligands without having to use an aqueous solvent or having to perform liquid-liquid separation.

FIG. 1 is a flow chart representing a ligand exchange method in accordance with the present embodiment in the order of steps involved.

The first nanoparticle-dispersed solution contains the nanoparticles, the first ligands, and the first organic solvent. Referring to FIG. 1, in the ligand exchange method in accordance with the present embodiment, first of all, the first nanoparticle-dispersed solution is diluted with the first organic solvent so as to achieve a desirable concentration of the nanoparticles in the first nanoparticle-dispersed solution (step S1; dilution step).

Next, the first nanoparticle-dispersed solution is mixed with a first ligand solution containing second ligands and a second organic solvent to replace the first ligands with the second ligands (ligand exchange) (step S2; first ligand exchange step).

Next, the nanoparticles to which the second ligands are coordinated are separated as a solid content (first solid content) from the liquid phase by solid-liquid separation (step S3; first separation step).

Next, a second ligand solution containing desirable target ligands and a third organic solvent is added to the first solid content to replace the second ligands with the target ligands (step S4; second ligand exchange step). The first ligands coordinated to the nanoparticles can be replaced by the target ligands in this manner.

Next, the nanoparticles to which the target ligands are coordinated are isolated as a second solid content (step S5; second separation step).

Next, the nanoparticles to which the target ligands are coordinated, isolated in step S5 described above, are dispersed in a fourth organic solvent (step S6; re-dispersion step).

These steps replace the first ligands with the target ligands, thereby ultimately producing the desirable nanoparticle-dispersed solution (target nanoparticle-dispersed solution) in which the nanoparticles are dispersed in the fourth organic solvent that is a desirable organic solvent.

A description is given below of these steps in more detail with reference to FIGS. 2 to 6.

Figure 2:
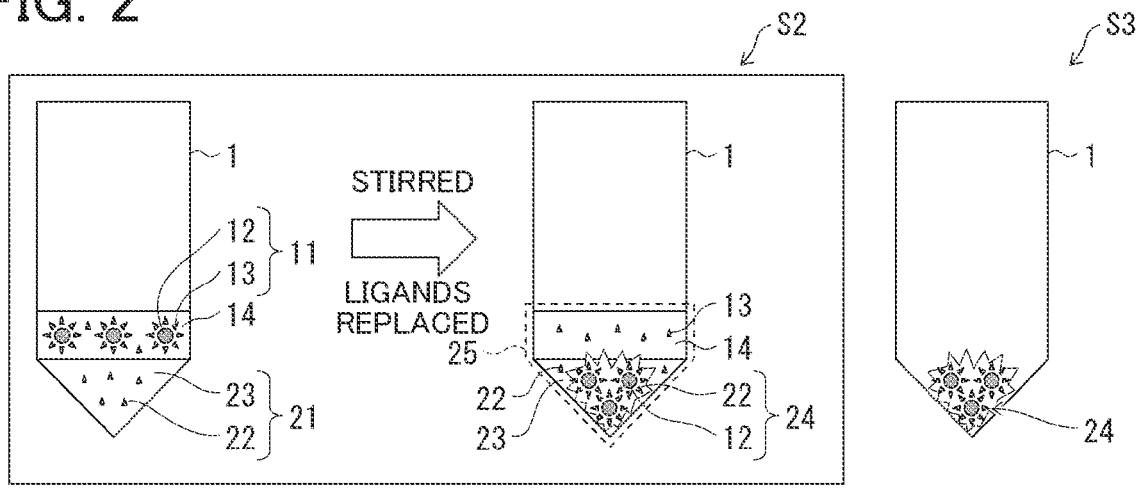
FIG. 2 is a schematic diagram of a part of the ligand exchange method represented in FIG. 1.

FIG. 2 is a schematic diagram of a part of the ligand exchange method represented in FIG. 1. FIG. 2 illustrates steps S2 and S3 shown in FIG. 1.

In the present embodiment, as described above, before step S2 illustrated in FIG. 2, a first nanoparticle-dispersed solution 11 is diluted in step S1 so that the first nanoparticle-dispersed solution 11 can have a desirable concentration in step S2. The concentration of the first nanoparticle-dispersed solution 11 is adjusted in this manner.

Referring to FIG. 2, the first nanoparticle-dispersed solution 11 contains nanoparticles 12, first ligands 13, and a first organic solvent 14. At least some of the first ligands 13 contained in the first nanoparticle-dispersed solution 11 are coordinated to the nanoparticles 12.

The nanoparticles 12 used in the present embodiment are not limited in any particular manner so long as the nanoparticles 12 have such nanoscale particle diameters as to require ligand exchange. The nanoparticles 12 are, for example, quantum dots (hereinafter, referred to as "QDs") or carrier-transportable inorganic nanoparticles.

QDs are typically inorganic nanoparticles with particle diameters of approximately from a few nanometers to a few tens of nanometers. QDs are alternatively called semiconductor nanoparticles because QDs are made of a semiconductor material. As another alternative, QDs may be called nanocrystals because QDs have a specific crystal structure. QDs are alternatively called fluorescent nanoparticles or QD fluorescent material particles because QDs fluorescence and have nanometer dimensions. Therefore, a QD light-emitting layer may be referred to as a QD fluorescent material layer.

The QDs may contain, for example, a semiconductor material composed of at least one element selected from the group consisting of, for example, Cd (cadmium), S (sulfur), Te (tellurium), Se (selenium), Zn (zinc), In (indium), N (nitrogen), P (phosphorus), As (arsenic), Sb (antimony), Al (aluminum), Ga (gallium), Pb (lead), Si (silicon), Ge (germanium), and Mg (magnesium). Note that typical QDs contain Zn. Therefore, the QDs may be, for example, a semiconductor material containing Zn.

In addition, the QDs may have a core structure, a core-shell structure, or a core-multishell structure. In addition, the QDs may have a two-component core structure, a three-component core structure, or a four-component core structure. Note that the QDs may contain doped nanoparticles or have a composition gradient structure. The QDs are able to deliver various emission wavelengths, depending on, for example, the diameter and composition of the particles.

In addition, the carrier-transportable nanoparticles may be, for example, hole-transportable inorganic nanoparticles or electron-transportable inorganic nanoparticles. The hole-transportable inorganic nanoparticles are used as a hole transport material. The electron-transportable inorganic nanoparticles are used as an electron transport material.

The hole-transportable inorganic nanoparticles may be, for example, fine particles composed of a p-type semiconductor material. This p-type semiconductor material may be, for example, a metal oxide, a Group IV semiconductor, a Group II-VI compound semiconductor, a Group III-V compound semiconductor, an amorphous semiconductor, or a thiocyanate compound. The metal oxide may be, for example, nickel oxide (NiO), titanium oxide ($TiO_2$), molybdenum oxide ($MoO_2$, $MoO_3$), magnesium oxide (MgO), or lanthanum nickel oxide ($LaNiO_3$). The Group IV semiconductor may be, for example, silicon (Si) or germanium (Ge). The Group II-VI compound semiconductor may be, for example, zinc sulfide (ZnS) or zinc selenide (ZnSe). The Group III-V compound semiconductor may be, for example, aluminum arsenide (AlAs), gallium arsenide (GaAs), indium arsenide (InAs), aluminum nitride (AlN), gallium nitride (GaN), indium nitride (InN), or gallium phosphide (GaP). The amorphous semiconductor may be, for example, p-type hydrogenated amorphous silicon or p-type hydrogenated amorphous silicon carbide. The thiocyanate compound may be, for example, a thiocyanate salt such as copper thiocyanate. Any one of these materials may be used alone; alternatively, two or more of the materials may be used in the form of mixture where appropriate.

The electron-transportable inorganic nanoparticles may be, for example, fine particles composed of a n-type semiconductor material. The n-type semiconductor material may be, for example, a metal oxide, a Group II-VI compound semiconductor, a Group III-V compound semiconductor, a Group IV-IV compound semiconductor, or an amorphous semiconductor. The metal oxide may be, for example, zinc oxide (ZnO), zinc magnesium oxide (ZnMgO), titanium oxide ($TiO_2$), indium oxide ($In_2O_3$), tin oxide (SnO, $SnO_2$), or cerium oxide ($CeO_2$). The Group II-VI compound semiconductor may be, for example, zinc sulfide (ZnS) or zinc selenide (ZnSe). The Group III-V compound semiconductor may be, for example, aluminum arsenide (AlAs), gallium arsenide (GaAs), indium arsenide (InAs), aluminum nitride (AlN), gallium nitride (GaN), indium nitride (InN), or gallium phosphide (GaP). The Group IV-IV compound semiconductor may be, for example, silicon germanium (SiGe) or silicon carbide (SiC). The amorphous semiconductor may be, for example, n-type hydrogenated amorphous silicon. Any one of these materials may be used alone; alternatively, two or more of the materials may be used in the form of mixture where appropriate.

The first ligands 13 may be any ligands contained in the first nanoparticle-dispersed solution 11 and having a coordinating functional group (adsorption group) that can be coordinated to the nanoparticles 12.

As described above, the ligands are used, for example, to control the particle diameters of nanoparticles in the synthesis of the nanoparticles and also to improve the surface stability, storage stability, or dispersion stability of the nanoparticles. Therefore, for example, nanoparticle-dispersed solutions obtained through synthesis or obtained commercially generally contain ligands. At least some of these ligands are coordinated to nanoparticles.

As described here, the first nanoparticle-dispersed solution 11 may be, for example, either a nanoparticle-dispersed solution obtained through synthesis or a nanoparticle-dispersed solution obtained commercially. Therefore, the first ligands 13 are not limited in any particular manner. The first ligands 13 may be a monomer, an oligomer, or a polymer.

The coordinating functional group is, typically, for example, at least one functional group selected from the group consisting of a thiol group, an amino group, a carboxy group, a phosphonic group, and a phosphine group.

The first ligands 13 may be, for example, oleic acid, dodecanoic acid, dodecanethiol, dodecylamine, trioctylphosphine, or trioctylphosphine oxide. Any one of these examples of the first ligands 13 may be used alone; alternatively, two or more of the examples of the first ligands 13 may be used in the form of mixture where appropriate.

The first organic solvent 14 may be any organic solvent in which the first ligands 13 are soluble or dispersible and in which the nanoparticles 12 to which the first ligands 13 are coordinated are dispersible. Therefore, the first organic solvent 14 is not limited in any particular manner so long as the first organic solvent 14 is selected in a suitable manner in accordance with the type of the nanoparticles 12 and the type of the first ligands 13 and satisfies the aforementioned conditions.

When the nanoparticles 12 are, for example, QDs, the first organic solvent 14 used is typically a non-polar organic solvent. Meanwhile, when the nanoparticles 12 are, for example, carrier-transportable inorganic nanoparticles, the first organic solvent 14 used is typically a polar organic solvent. It should be understood however that these examples are not the only possible implementation of the disclosure.

The first nanoparticle-dispersed solution 11 used in step S2 has a concentration that, although may be variable depending on the type of the first ligands 13, is preferably in the range of from 0.001 mg/mL to 100 mg/mL, both inclusive, and more preferably in the range of from 0.01 mg/mL to 20 mg/mL, both inclusive.

As the concentration of the first nanoparticle-dispersed solution 11 increases, the first ligands 13 become increasingly difficult to remove from the nanoparticles 12, hence to replace with other ligands, which could inhibits ligand exchange depending on the type of ligands or nanoparticles. On the other hand, as the concentration of the first nanoparticle-dispersed solution 11 decreases, ligand exchange becomes easier, but if the nanoparticles 12 are not very stable, the ligands may fail to deliver a sufficient time of protection, which could lead to degradation of properties.

Therefore, in step S1 described above, the first nanoparticle-dispersed solution 11 is preferably diluted with the first organic solvent 14 so that the concentration of the nanoparticles 12 in the first nanoparticle-dispersed solution 11 can fall in the aforementioned range. This dilution in step S1 is not essential, but helps efficient ligand exchange in step S2.

As denoted by S2 in FIG. 2, in step S2, the first nanoparticle-dispersed solution 11 and a first ligand solution 21 are mixed by, for example, stirring in a container 1 as a reaction vessel.

The first ligand solution 21 contains second ligands 22 and a second organic solvent 23.

The second ligands 22 are monodentate ligands that, when coordinated to the nanoparticles 12, render the nanoparticles 12 non-dispersible in solvents. The second ligands 22 remarkably reduce the dispersibility of the nanoparticles 12 in any solvent by being coordinated to the nanoparticles 12.

The second ligands 22, as described above, are monodentate ligands and include one coordinating functional group that can be coordinated to the nanoparticles 12.

The coordinating functional group may be any functional group that can be coordinated to the nanoparticles 12. Therefore, the coordinating functional group may be, for example, one of the exemplary coordinating functional groups listed above (e.g., at least one functional group selected from the group consisting of a thiol group, an amino group, a carboxy group, a phosphonic group, and a phosphine group).

The second ligands 22, as described here, is a monomer including one coordinating functional group that can be coordinated to the nanoparticles 12 and also including a preferably $C_1$-$C_8$, more preferably $C_1$-$C_8$, main chain backbone detailed below.

Note that the second ligands 22 may or may not include a ring (ring structure).

When the second ligands 22 include no ring, for example, when the second ligands 22 are, for example, a chain compound, the main chain backbone is defined as a carbon chain with the largest number of carbons among the carbon chains linking the carbon to which the coordinating functional group is bonded to the carbon located in a terminal group by the shortest distance.

Meanwhile, when the second ligands 22 include a ring, for example, when the second ligands 22 are, for example, a cyclic compound such as an alicyclic compound or an aromatic compound, if the ring includes no substituent (side chain, branched chain) other than the coordinating functional group or the substituent containing the coordinating functional group, the carbon located in the opposite position from the carbon bonded to the coordinating functional group or the substituent containing the coordinating functional group is the carbon that is located farthest on the ring from the carbon to which the coordinating functional group is bonded. In addition, cyclic carbon chains are limited in movement in comparison with a chain-like carbon chain. Therefore, when the second ligands 22 include a ring, the second ligands 22 include no carbon chain that affects the number of carbons in the carbon chain in the ring=the dispersibility of nanoparticles.

Accordingly, when the second ligands 22 include a ring, the main chain backbone is defined as the carbon chain, either (i) and (ii) below, that includes more carbons:
(i) the carbon chain linking the carbon to which the coordinating functional group is bonded to the carbon located on the ring in the opposite position from the carbon bonded to the coordinating functional group or the substituent containing the coordinating functional group (hereinafter, referred to as the "the oppositely positioned carbon") by the shortest distance along the ring; and (ii) when a substituent other than the coordinating functional group or the substituent containing the coordinating functional group is bonded to the ring, a carbon chain with the largest number of carbons among the carbon chains linking the carbon to which the coordinating functional group is bonded to a terminal carbon of the substituent, bonded to the ring, other than the coordinating functional group or the substituent containing the coordinating functional group by the shortest distance along the ring.

Note that in (i) and (ii), the "carbon to which the coordinating functional group is bonded" refers, when the coordinating functional group is bonded to the ring, to the carbon, located on the ring, to which the coordinating functional group is bonded and when a substituent containing the coordinating functional group is bonded to the ring, to the carbon, located in the substituent, to which the coordinating functional group is bonded.

In other words, when the second ligands 22 include a ring, the maximum carbon count of the ring is defined as the number of carbons on the ring from the carbon to which the coordinating functional group or the substituent containing the coordinating functional group is bonded through the oppositely positioned carbon as counted along the ring, starting with the carbon bonded at position 1 to the coordinating functional group or the substituent containing the coordinating functional group as the first carton. For example, when the second ligands 22 include a benzene ring, the carbon at the p-position (position 4) is the oppositely positioned carbon, and the benzene ring has a maximum carbon count of 4.

When no substituent other than the coordinating functional group or the substituent containing the coordinating functional group is bonded to the ring, the number of carbons in the carbon chain linking the carbon to which the coordinating functional group is bonded to the oppositely positioned carbon (i.e., the carbon located on the ring in the opposite position from the carbon to which the coordinating functional group or the substituent containing the coordinating functional group is bonded) by the shortest distance along the ring is the number of carbons in the main chain backbone.

Meanwhile, when a substituent other than the coordinating functional group or the substituent containing the coordinating functional group is bonded to the ring, the number of carbons in the carbon chain linking the carbon to which the coordinating functional group is bonded to the oppositely positioned carbon by the shortest distance along the ring is compared with the number of carbons in the carbon chain linking the carbon to which the coordinating functional group is bonded to a terminal carbon of the substituent, bonded to the ring, other than the coordinating functional group or the substituent containing the coordinating functional group by the shortest distance along the ring, and the largest number of carbons among these the numbers of carbons is the number of carbons in the main chain backbone.

In other words, letting a first path be the path linking the carbon to which the coordinating functional group is bonded to the oppositely positioned carbon by the shortest distance along the ring and a second path be the path linking the carbon to which the coordinating functional group is bonded to a terminal carbon of the substituent, bonded to the ring, other than the coordinating functional group or the substituent containing the coordinating functional group by the shortest distance along the ring, if the two paths are compared, and the second path is longer than the first path, the second path is the main chain backbone.

Note that in either case, the coordinating functional group itself is not included in the main chain backbone. Therefore, even when the coordinating functional group contains a carbon, the number of carbons in the main chain backbone excludes the number of carbons in the coordinating functional group.

Examples of the second ligands 22 include thiols containing one thiol group and having a $C_1$-$C_8$ main chain backbone such as ethyl mercaptan (ethanethiol), 1-propanethiol, 1-butanethiol, 1-pentanethiol, 2-methyl-1-butanethiol, o-toluenethiol, m-toluenethiol, p-toluenethiol, 2,4-dimethylbenzenethiol, 3,4-dimethylbenzenethiol, 2,5-dimethylbenzenethiol, 3,5-dimethylbenzenethiol, and 3-methylcyclopentanethiol; amines containing one amino group and having a $C_1$-$C_8$ main chain backbone such as methylamine, pentylamine, and p-toluidine; carboxylic acids containing one carboxy group and having a $C_1$-$C_8$ main chain backbone such as pentanoic acid and benzoic acid; phosphonic acids containing one phosphonic group and having a $C_1$-$C_8$ main chain backbone such as ethylphosphonate; and phosphines containing one phosphine group and having a $C_1$-$C_8$ main chain backbone such as trimethylphosphine. Any one of these examples of the second ligands 22 may be used alone; alternatively, two or more of the examples of the second ligands 22 may be used in the form of mixture where appropriate.

As described earlier, the second ligands 22 may be linear alkylthiol-based ligands, linear alkylamine-based ligands, linear alkylcarboxylate-based ligands, linear alkylphosphonate-based ligands, linear alkylphosphinate-based ligands, or other like aliphatic ligands. Alternatively, The second ligands 22 may be benzenethiol-based ligands, benzenamine-based ligands, benzenecarboxylate-based ligands, benzenephosphonate-based ligands, benzenephosphinate-based ligands, or other like aromatic or alicyclic ligands. In addition, any of these examples may have, for example, a branched chain or a substituent.

A specific description is given below by way of example as to how carbons are counted in the main chain backbone of the second ligands 22. A first example is pentylamine, which provides linear alkylamine-based ligands. Since pentylamine includes no ring, the main chain backbone is one of carbon chains that includes the largest number of carbons, the carbon chains linking the carbon to which a coordinating functional group is bonded to the carbon located in a terminal group by the shortest distance. Therefore, the number of carbons in the main chain backbone of pentylamine is equal to 5 as indicated by (1) to (5) in formula (A) below.

[Chem. 1]

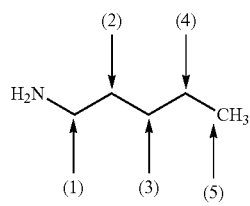

(A)

A next example is 2-methyl-1-butanethiol, which provides aliphatic ligands with a branched chain. In 2-methyl-1-butanethiol, the carbon chains linking the carbon to which a coordinating functional group is bonded to the carbon located in a terminal group by the shortest distance may be either a $C_4$ carbon chain (first carbon chain) with carbons indicated by (1) to (4) in formula (B) below or a $C_3$ carbon chain (second carbon chain) with carbons indicated by (1), (2), and (3)' in formula (B) below. In this example, since the first carbon chain includes more carbons than the second carbon chain, the first carbon chain is the main chain backbone, and the carbon chain including the carbon indicated by (3)', branching off from the main chain backbone, is the branched chain. Therefore, the number of carbons in the main chain backbone of 2-methyl-1-butanethiol is equal to 4.

[Chem. 2]

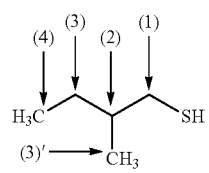

(B)

A next example is p-toluenethiol, which provides aromatic ligands (specifically, benzenethiol-based ligands) with a substituent other than a coordinating functional group being bonded to the benzene ring. As illustrated in formula (C) below, p-toluenethiol includes: a coordinating functional group directly bonded to the benzene ring; and a substituent, other than the coordinating functional group, at a position on the benzene ring opposite the carbon to which the coordinating functional group is bonded. Therefore, the carbon chain linking the carbon to which the coordinating functional group is bonded to a terminal carbon of a substituent other than the coordinating functional group by the shortest distance along the benzene ring is the main chain backbone.

In p-toluenethiol, the carbon chain linking the carbon to which a coordinating functional group is bonded to a terminal carbon of a substituent other than the coordinating functional group by the shortest distance along the benzene ring may be either a carbon chain (first carbon chain) with carbons indicated by (1) to (5) in formula (C) below or a carbon chain (second carbon chain) with carbons indicated by (1), (2)', (3)', (4), and (5) in formula (C) below. In this example, since the first carbon chain includes the same number of carbons as the second carbon chain, either one of these carbon chains can be the main chain backbone. The number of carbons in the main chain backbone of p-toluenethiol is equal to 5 in both cases.

[Chem. 3]

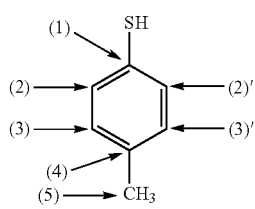

(C)

A next example is o-toluenethiol, which provides benzenethiol-based ligands with a substituent other than a coordinating functional group being bonded to the benzene ring. As illustrated in formula (D) below, o-toluenethiol includes: a coordinating functional group directly bonded to the benzene ring; and a substituent, other than the coordinating functional group, partway along a path linking the carbon to which the coordinating functional group is bonded to the oppositely positioned carbon (carbon at the p-position) on the benzene ring by the shortest distance along the benzene ring.

In o-toluenethiol, the carbon chain linking the coordinating functional group to the carbon at the p-position by the shortest distance along the benzene ring may be either a carbon chain (first carbon chain) with carbons indicated by (1) to (4) in formula (D) below or a carbon chain (second carbon chain) with carbons indicated by (1), (2)', (3)', and (4) in formula (D) below. In this example, the number of carbons in either one of these carbon chains is equal to 4.

Meanwhile, in o-toluenethiol, the carbon chain linking the carbon to which a coordinating functional group is bonded to a terminal carbon of a substituent other than the coordinating functional group by the shortest distance along the benzene ring is the carbon chain (third carbon chain) with carbons indicated by (1), (2)', and (3)'' in formula (D) below, and the number of carbons in the carbon chain is equal to 3.

Note that the carbon chain linking the carbon to which a coordinating functional group is bonded to the carbon to which a substituent other than the coordinating functional group is bonded on the benzene ring may be either a $C_3$ carbon chain with carbons indicated by (1), (2)', and (3)'' in formula (D) below or a $C_6$ carbon chain with carbons indicated by (1) to (4), (3)', and (2)' in formula (D) below, both of which provides the third carbon chain.

However, as described earlier, in the present embodiment, the maximum carbon count of a ring is the number of carbons on the ring from the carbon bonded to the coordinating functional group to the oppositely positioned carbon, as counted along the ring. The number of carbons, which is 6, exceeds the maximum carbon count of the benzene ring, which is 4. In addition, the path linking the carbons indicated by (1) to (4), (3)', and (2)' in formula (D) below does not link the carbon to which a coordinating functional group is bonded to a terminal carbon of a substituent other than the coordinating functional group by the shortest distance along the benzene ring. In other words, the carbon chain with carbons indicated by (1) to (4), (3)', and (2)' in formula (D) below does not link the carbon to which a coordinating functional group is bonded to a terminal carbon of a substituent other than the coordinating functional group by the shortest distance along the benzene ring.

Therefore, on the benzene ring of o-toluenethiol, either the first carbon chain or the second carbon chain that links the carbon to which a coordinating functional group is bonded to the carbon at the p-position by the shortest distance along the benzene ring is the main chain backbone of o-toluenethiol. In this example, the number of carbons in the main chain backbone of o-toluenethiol is equal to 4 in both cases.

[Chem. 4]

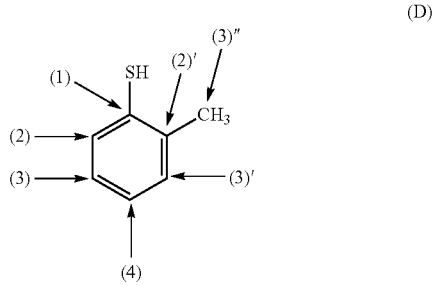

(D)

Likewise, as illustrated in formula (E) below, m-toluenethiol, which provides benzenethiol-based ligands with a substituent other than a coordinating functional group being bonded to the benzene ring, includes: a coordinating functional group directly bonded to the benzene ring; and a substituent, other than the coordinating functional group, partway along a path linking the carbon to which the coordinating functional group is bonded to the oppositely positioned carbon (carbon at the p-position) on the benzene ring by the shortest distance along the benzene ring.

On the benzene ring of m-toluenethiol, the carbon chain linking the carbon to which a coordinating functional group is bonded to the carbon at the p-position by the shortest distance along the benzene ring may be either a carbon chain (first carbon chain) with carbons indicated by (1) to (4) in formula (E) below or a carbon chain (second carbon chain) with carbons indicated by for example, (1), (2)', (3)', and (4) in formula (E) below. In this example, the number of carbons in either one of these carbon chains is equal to 4.

In m-toluenethiol, the carbon chain linking the carbon to which a coordinating functional group is bonded to a terminal carbon of a substituent other than the coordinating functional group by the shortest distance along the benzene ring is the carbon chain (third carbon chain) with carbons indicated by (1), (2)', (3)', and (4)' in formula (E) below, and the number of carbons in the carbon chain is equal to 4.

In this example, since the first carbon chain, the second carbon chain, and the third carbon chain all include the same number of carbons, any of these carbon chains can be the main chain backbone. The number of carbons in the main chain backbone of m-toluenethiol is equal to 4 in any of the cases.

[Chem. 5]

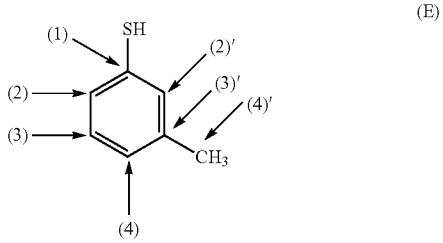

(E)

A next example is 2,4-dimethylbenzenethiol, which provides benzenethiol-based ligands with two substituents other than a coordinating functional group being bonded to the benzene ring. As illustrated in formula (F) below, 2,4-dimethylbenzenethiol includes: a coordinating functional group directly bonded to the benzene ring; a substituent, other than the coordinating functional group, partway along a path linking the carbon to which the coordinating functional group is bonded to the oppositely positioned carbon (carbon at the p-position) on the benzene ring by the shortest distance along the benzene ring; and another substituent, other than the coordinating functional group, in the opposite position from the coordinating functional group.

As illustrated in formula (F) below, when there is included a substituent, other than a coordinating functional group, in the opposite position from the coordinating functional group on the benzene ring, the carbon chain linking the carbon to which the coordinating functional group is bonded to a terminal carbon of a substituent, other than the coordinating functional group, bonded to the oppositely positioned carbon by the shortest distance along the benzene ring is undoubtedly longer than the carbon chain linking the carbon to which the coordinating functional group is bonded to the oppositely positioned carbon on the benzene ring by the shortest distance along the benzene ring.

On the benzene ring of 2,4-dimethylbenzenethiol, the carbon chain linking the carbon to which a coordinating functional group is bonded to a terminal carbon of a substituent, other than the coordinating functional group, at the p-position by the shortest distance along the benzene ring may be either the carbon chain (first carbon chain) with carbons indicated by (1) to (5) in formula (F) below or the carbon chain (second carbon chain) with carbons indicated by (1), (2)', (3)', (4), and (5) in formula (F) below. In this example, the number of carbons in either one of these carbon chains is equal to 5.

2,4-dimethylbenzenethiol includes a substituent, other than the coordinating functional group, at the o-position (at position 2) as well as at the p-position (at position 4). On the benzene ring of 2,4-dimethylbenzenethiol, the carbon chain linking the carbon to which a coordinating functional group is bonded to a terminal carbon of a substituent, other than the coordinating functional group, at the o-position by the shortest distance along the benzene ring is the carbon chain (third carbon chain) with carbons indicated by (1), (2)', and (3)" in formula (F) below, and the number of carbons in this carbon chain is equal to 3.

Therefore, either the first carbon chain or the second carbon chain that links the carbon to which a coordinating functional group is bonded on the benzene ring of 2,4-dimethylbenzenethiol to a terminal carbon of a substituent other than the coordinating functional group at the p-position by the shortest distance along the benzene ring is the main chain backbone of 2,4-dimethylbenzenethiol. The number of carbons in the main chain backbone of 2,4-dimethylbenzenethiol is equal to 5 in both cases.

[Chem. 6]

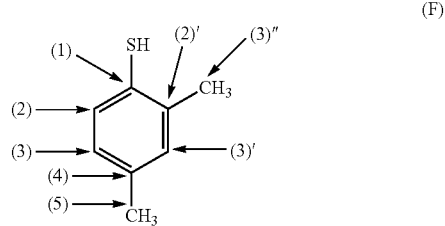

(F)

A next example is 2,5-dimethylbenzenethiol, which provides benzenethiol-based ligands with two substituents other than a coordinating functional group being bonded to the benzene ring. As illustrated in formula (G) below, 2,5-dimethylbenzenethiol includes: a coordinating functional group directly bonded to the benzene ring; and two substituents other than the coordinating functional group partway along a path linking the carbon to which the coordinating functional group is bonded to the oppositely positioned carbon (carbon at the p-position) on the benzene ring by the shortest distance along the benzene ring.

On the benzene ring of 2,5-dimethylbenzenethiol, the carbon chain linking the carbon to which a coordinating functional group is bonded to a terminal carbon of a substituent other than the coordinating functional group at the p-position by the shortest distance along the benzene ring may be either the carbon chain (first carbon chain) with carbons indicated by (1) to (4) in formula (G) below or the carbon chain (second carbon chain) with carbons indicated by (1), (2)', (3)', and (4) in formula (F) below. The number of carbons in either one of these carbon chains is equal to 4.

On the benzene ring of 2,5-dimethylbenzenethiol, the carbon chain linking the carbon to which a coordinating functional group is bonded to a terminal carbon of a substituent other than the coordinating functional group at the o-position (at position 2) by the shortest distance along the benzene ring is the carbon chain (third carbon chain) with carbons indicated by (1), (2)', and (3)'' in formula (G) below, and the number of carbons in the carbon chain is equal to 3.

On the benzene ring of 2,5-dimethylbenzenethiol, the carbon chain linking the carbon to which a coordinating functional group is bonded to a terminal carbon of a substituent other than the coordinating functional group at the m-position (at position 5) by the shortest distance along the benzene ring is the carbon chain (fourth carbon chain) with carbons indicated by (1), (2), (3), and (4)' in formula (G) below, and the number of carbons in the carbon chain is equal to 4.

In this example, since the first carbon chain, the second carbon chain, and the fourth carbon chain all include the same number of carbons, any of these carbon chains can be the main chain backbone. The number of carbons in the main chain backbone of 2,5-dimethylbenzenethiol is equal to 4 in any of the cases.

[Chem. 7]

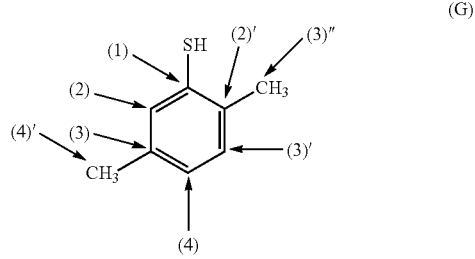

(G)

A next example is benzoic acid, which provides aromatic ligands (specifically, benzenecarboxylate-based ligands) with a carbon-containing coordinating functional group being bonded to the benzene ring. Benzoic acid includes a coordinating functional group directly bonded to the benzene ring, but no substituents other than the coordinating functional group, as illustrated in formula (H) below. Therefore, the number of carbons in the carbon chain linking the carbon to which a coordinating functional group is bonded to the oppositely positioned carbon (carbon at the p-position) on the benzene ring by the shortest distance along the benzene ring is the number of carbons in the main chain backbone. In benzoic acid, the coordinating functional group per se contains a carbon, but as described above, the coordinating functional group does not make a part of the main chain backbone. Therefore, the main chain backbone of benzoic acid may be either the carbon chain (first carbon chain) with carbons indicated by (1) to (4) in formula (H) below or the carbon chain (second carbon chain) with carbons indicated by (1), (2)', (3)', and (4) in formula (H) below. The number of carbons in the main chain backbone of benzoic acid is equal to 4 in both cases.

[Chem. 8]

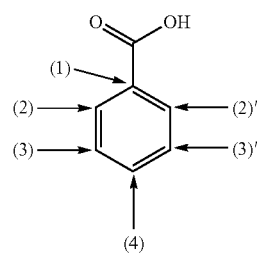

(H)

A next example is 3-methylcyclopentanethiol, which provides alicyclic-based ligands with a single substituent other than a coordinating functional group being bonded. As illustrated in formula (I) below, 3-methylcyclopentanethiol includes: a coordinating functional group directly bonded to cyclopentane (five-membered ring); and a substituent other than the coordinating functional group at the opposite position from the coordinating functional group on the cyclopentane. Therefore, the main chain backbone is the carbon chain linking the carbon to which the coordinating functional group is bonded to the a terminal carbon of a substituent other than the coordinating functional group by the shortest distance along the ring.

On the cyclopentane, the carbon chain linking the carbon to which a coordinating functional group is bonded to the carbon to which a substituent other than the coordinating functional group is bonded may be either the $C_3$ carbon chain (first carbon chain) with carbons indicated by (1) to (3) in formula (I) below or the $C_4$ carbon chain (second carbon chain) with carbons indicated by (1), (2)', (3)', and (3) in formula (I) below.

However, the opposite position from the coordinating functional group in cyclopentanethiol is position 3, and cyclopentane, which is a part of the main chain backbone, has a maximum number of carbons that is equal to 3. The number of carbons, which is 4, exceeds the maximum carbon count of cyclopentane, which is 3. In addition, the path linking carbons indicated by (1), (2)', (3)', and (3) in formula (I) below does not link the carbon to which a coordinating functional group is bonded to a terminal carbon of a substituent other than the coordinating functional group by the shortest distance along the ring.

Therefore, the carbon chain that contains the first carbon chain with carbons indicated by (1) to (4) in formula (I) below is the main chain backbone of 3-methylcyclopentanethiol. Therefore, the number of carbons in the main chain backbone of 3-methylcyclopentanethiol is equal to 4.

[Chem. 9]

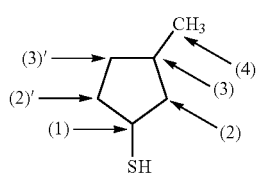

(I)

A next example is 4-phenylbutylamine, which provides aromatic ligands with a substituent containing a coordinating functional group being bonded to the benzene ring. In 4-phenylbutylamine, only a —(CH$_2$)$_4$NH$_2$ group containing an amino group (—NH$_2$) that is a coordinating functional group is bonded as a substituent to the benzene ring. Therefore, the number of carbons in the carbon chain linking the carbon to which an amino group in the substituent is bonded to the carbon (carbon at the p-position) positioned on the benzene ring opposite from the carbon to which the substituent is bonded by the shortest distance along the benzene ring is the number of carbons in the main chain backbone. Since the number of carbons in the substituent in the main chain backbone is equal to 4, and the maximum carbon count of the benzene ring in the main chain backbone is equal to 4, the number of carbons in the main chain backbone of 4-phenylbutylamine is equal to 8.

Note that the number of carbons in the main chain backbone of the second ligands 22 that is not described above can be similarly determined. Table 1 shows examples of the second ligands 22 that may be used in the present embodiment, along with the number of carbons in the main chain backbone thereof.

TABLE 1

| Second ligands | Number of carbons in main chain backbone |
|---|---|
| ethyl mercaptan | 2 |
| 1-propanethiol | 3 |
| 1-butanethiol | 4 |
| 1-pentanethiol | 5 |
| 2-methyl-1-butanethiol | 4 |
| o-toluenethiol | 4 |
| m-toluenethiol | 4 |
| p-toluenethiol | 5 |
| 2,4-dimethylbenzenethiol | 5 |
| 3,4-dimethylbenzenethiol | 5 |
| 2,5-dimethylbenzenethiol | 4 |
| 3,5-dimethylbenzenethiol | 4 |
| 3-methylcyclopentanethiol | 4 |
| 4-tert-butylbenzenethiol | 6 |
| 4-isopropylbenzenethiol | 6 |
| methylamine | 1 |
| pentylamine | 5 |
| p-toluidine | 5 |
| 4-phenylbutylamine | 8 |
| pentanoic acid | 4 |
| benzoic acid | 4 |
| ethylphosphonate | 2 |
| trimethylphosphine | 1 |

Note that these examples are given for illustrative purposes only. As described above, the second ligands 22 are not limited in any particular manner so long as the second ligands 22 are monodentate ligands that, when coordinated to the nanoparticles 12, render the nanoparticles 12 non-dispersible in solvents.

Among these examples, the second ligands 22 are preferably at least one species of ligands selected from the group consisting of, for example, ethyl mercaptan, 1-propanethiol, 1-butanethiol, 1-pentanethiol, 2-methyl-1-butanethiol, o-toluenethiol, m-toluenethiol, p-toluenethiol, 2,4-dimethylbenzenethiol, 3,4-dimethylbenzenethiol, 2,5-dimethylbenzenethiol, 3,5-dimethylbenzenethiol, 3-methylcyclopentanethiol, 4-tert-butylbenzenethiol, 4-isopropylbenzenethiol, methylamine, pentylamine, p-toluidine, 4-phenylbutylamine, pentanoic acid, benzoic acid, ethylphosphonate, and trimethylphosphine, all of which are described above. The second ligands 22 are more preferably ligands with a $C_1$-$C_5$ main chain backbone and are even more preferably p-toluenethiol.

The second organic solvent 23 is an organic solvent that either dissolves or disperses the second ligands 22 and that has an opposite polarity from the first organic solvent 14. Therefore, when, for example, the nanoparticles 12 are QDs, and the first organic solvent 14 is a non-polar organic solvent, as described above, the second organic solvent 23 is a polar organic solvent. Meanwhile, when, for example, the nanoparticles 12 are carrier-transportable inorganic nanoparticles, and the first organic solvent 14 is a polar organic solvent, the second organic solvent 23 is a non-polar organic solvent.

The non-polar organic solvent is suitably an organic solvent with a permittivity (Y) of from 1.8 to 6.1, both inclusive (i.e., $1.8 \leq Y \leq 6.1$). The polar organic solvent is suitably an organic solvent with a permittivity (Y) of from 6.1 exclusive to 50 inclusive (i.e., $6.1 < Y \leq 50$).

Table 2 shows permittivities of major solvents. Note that permittivity in the present embodiment is measured at around 20° C. to 25° C. Since the typically disclosed permittivity is measured at around 20° C. to 25° C., the typically disclosed permittivity per se can be used as the permittivity. Note that the method and instrument for permittivity measurement are not limited in any particular manner. As an example, a liquid permittivity meter may be used.

TABLE 2

| Solvent | Permittivity |
|---|---|
| pentane | 1.84 |
| hexane | 1.89 |
| heptane | 1.92 |
| octane | 1.948 |
| carbon tetrachloride | 2.24 |
| p-xylene | 2.27 |
| benzene | 2.28 |
| toluene | 2.38 |
| diethyl ether | 4.34 |
| chloroform | 4.9 |
| butyl acetate | 5.01 |
| isobutyl acetate | 5.29 |
| chlorobenzene | 5.62 |
| ethyl acetate | 6.02 |
| dimethyl ether | 6.18 |
| THF | 7.6 |
| dichloromethane | 9.08 |
| 1,2-dichloroethane | 10.42 |
| ethylene glycol monomethyl ether | 16.9 |
| 1-butanol | 17.5 |
| 2-propanol | 19.9 |
| 1-propanol | 20.3 |
| acetone | 20.7 |
| acetaldehyde | 21.1 |
| ethanol | 24.6 |
| methanol | 32.7 |
| DMF | 36.7 |
| acetonitrile | 37.5 |
| ethylene glycol | 37.7 |
| DMSO | 46.7 |

As shown in Table 2, examples of the organic solvent that satisfies $1.8 \leq Y \leq 6.1$ include pentane, hexane, heptane, octane, carbon tetrachloride, p-xylene, benzene, toluene, diethyl ether, chloroform, butyl acetate, isobutyl acetate, chlorobenzene, and ethyl acetate.

Also as shown in Table 2, examples of the organic solvent that satisfies $6.1 < Y \leq 50$ include dimethyl ether, tetrahydrofuran (THF), dichloromethane, 1,2-dichloroethane, ethylene glycol monomethyl ether, 1-butanol, 2-propanol, 1-propanol, acetone, acetaldehyde, ethanol, methanol, N, N-dimethyl formamide (DMF), acetonitrile, ethylene glycol, and dimethyl sulfoxide (DMSO).

The concentration of the second ligands 22 in the first ligand solution 21 is preferably 1 mg/mL or higher and more preferably 10 mg/mL or higher, depending on the type of the first ligands 13 and ease in coordinating the second ligands 22 in the first nanoparticle-dispersed solution 11.

Since a higher concentration of the second ligands 22 facilitates the substitution of the second ligands 22 for the first ligands 13, the concentration is preferably as high as possible. Therefore, the concentration of the second ligands 22 has no particular upper limit, but is preferably 1500 mg/mL or lower, and more preferably 500 mg/mL or lower, with a view to, for example, the solubility of the second ligands 22 in the second organic solvent 23 or the dispersibility and manufacturing cost of the second ligands 22.

Note that the supply amount of the second ligands 22 is not limited in any particular manner and may be specified in such a suitable manner as to supply the second ligands 22, for example, in an excessive amount that exceeds the amount of the second ligands 22 that can be coordinated to the nanoparticles 12, for example, in accordance with, for example, the type and amount of the nanoparticles 12. Since the amount of the second ligands 22 supplied is sufficient for each nanoparticle 12 regardless of the foregoing various conditions, the amount of the second ligands 22 actually coordinated to the nanoparticles 12 will likely vary depending on the concentration of the second ligands 22 contained in the first ligand solution 21. Note that the excess second ligands 22, not coordinated to the nanoparticles 12, are separated out and removed in step S3 (first separation step).

In step S2, the first ligands 13 coordinated to the nanoparticles 12 can be replaced by the second ligands 22, by mixing the first nanoparticle-dispersed solution 11 and the first ligand solution 21.

The reaction conditions such as reaction temperature and reaction time in the ligand exchange reaction (step S2) may be specified in such a suitable manner in accordance with, for example, the types and amounts of the first ligands 13, the second ligands 22, and the second organic solvent 23, as to complete the ligand exchange reaction. Therefore, the foregoing reaction conditions are not limited in any particular manner.

The ligand exchange reaction proceeds further at higher reaction temperatures. However, the ligands and nanoparticles 12 used could degrade or decompose at high reaction temperatures. In addition, at high reaction temperatures, the second organic solvent 23 could vanish depending on the boiling point of the second organic solvent 23. Therefore, the reaction temperature is preferably, for example, 100° C. or lower, and more preferably 60° C. or lower, depending on the types and amounts of the first ligands 13, the second ligands 22, and the second organic solvent 23. In addition, the ligand exchange ratio increases with a longer reaction time. However, the substitution may be substantially completed in several minutes under good reaction conditions. The substitution takes approximately no longer than 24 hours in most cases.

The nanoparticles 12 to which the second ligands 22 are coordinated do not disperse in any solvent. Note that in the following description, the nanoparticles 12 to which the second ligands 22 are coordinated may be referred to as second-ligand-modified nanoparticles 24. Therefore, the second-ligand-modified nanoparticles 24 disperse neither in the first organic solvent 14 nor in the second organic solvent 23 and aggregate and gradually deposit from the colloidal solution with the progress of the ligand exchange. The deposited second-ligand-modified nanoparticles 24 further aggregate to precipitate forming a mass.

Meanwhile, as described above, the first ligands 13 are soluble or dispersible in the first organic solvent 14. Therefore, the first ligands 13 freed from the nanoparticles 12 in the ligand exchange are dissolved or dispersed in the first organic solvent 14.

In addition, as described above, the second ligands 22 are soluble or dispersible in the second organic solvent 23. As described above, in step S2, the second ligands 22 are supplied in an amount that is excessive to the nanoparticles 12. Therefore, a reaction solution 25 after the ligand exchange contains excess second ligands 22. The excess second ligands 22 not coordinated to the nanoparticles are dissolved or dispersed in the second organic solvent 23. Note that the "excess second ligands 22 not coordinated to the nanoparticles" refers to the free second ligands 22 that are not coordinated to the nanoparticles 12.

Accordingly, in the present embodiment, as denoted by step S3 in FIG. 2, the second-ligand-modified nanoparticles 24 are separated as a solid content (first solid content) from the liquid phase by solid-liquid separation after the ligand exchange.

Figure 3:
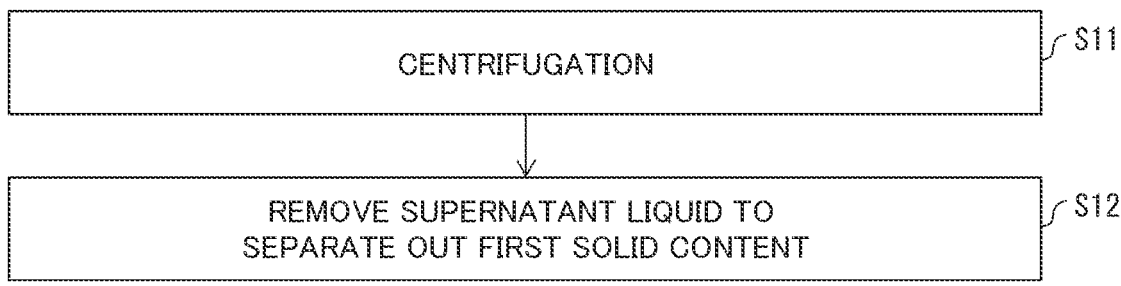
FIG. 3 is a flow chart representing an example of a first separation step shown in FIGS. 1 and 2.

FIG. 3 is a flow chart representing an example of a first separation step denoted by step S3 in FIGS. 1 and 2 (step S3). Step S3 may include, for example, the following procedures.

Referring to FIG. 3, for example, centrifugation is performed in step S3 to precipitate the deposited second-ligand-modified nanoparticles 24 as the first solid content (step S11). Next, a liquid phase (supernatant liquid) is removed leaving behind the first solid content (second-ligand-modified nanoparticles 24), which is a precipitate, to perform solid-liquid separation of the first solid content from the liquid phase (step S12).

The first organic solvent 14 and the second organic solvent 23 are not miscible (not compatible) to each other and separated in two phases, that is, a first organic solvent phase and a second organic solvent phase. The first organic solvent phase contains free first ligands 13. The second organic solvent phase contains free second ligands 22. Therefore, the replaced first ligands 13 and the excess second ligands 22 are removed by removing the liquid phase (supernatant liquid) as described above.

Note that in so doing, the first solid content may be rinsed by adding the first organic solvent 14 and the second organic solvent 23 again and removing the liquid phase (supernatant liquid) with the precipitate being left behind. Since the first solid content is not dispersible in any solvent, the free first ligands 13 and the free second ligands 22, which are remaining in the container 1, can be removed by adding the first organic solvent 14 and the second organic solvent 23 and removing the supernatant liquid.

Figure 4:
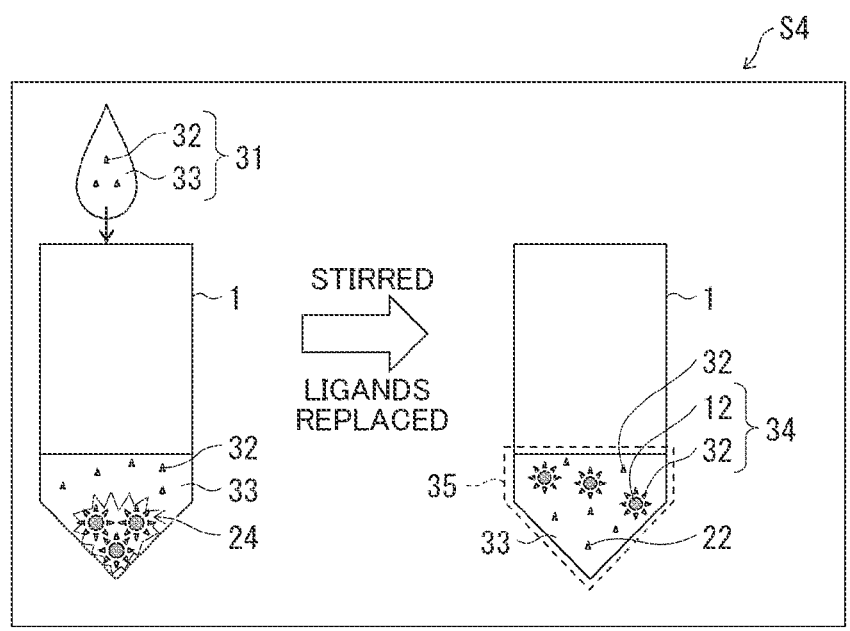
FIG. 4 is a schematic diagram of another part of the ligand exchange method represented in FIG. 1.

FIG. 4 is a schematic diagram of another part of the ligand exchange method represented in FIG. 1. FIG. 4 illustrates step S4 shown in FIG. 1.

Referring to FIG. 4, in step S4, a second ligand solution 31 and the first solid content are mixed by, for example, adding the second ligand solution 31 to the first solid content (second-ligand-modified nanoparticles 24) separated out in step S3 in the container 1 and stirring the content of the container 1. The second ligand solution 31 contains desirable target ligands 32 and a desirable third organic solvent 33. In this manner, the second ligands 22 are replaced by the target ligands 32, and the nanoparticles 12 to which the target ligands 32 are coordinated are dispersed in the third organic solvent 33. Note that in the following description, the nanoparticles 12 to which the target ligands 32 are coordinated may be referred to as target-ligand-modified nanoparticles 34.

The target ligands 32 may be any ligands with a coordinating functional group that can be coordinated to the nanoparticles 12. The target ligands 32 may be a monomer, an oligomer, or a polymer. Note that in such a case, the coordinating functional group may again be, for example, any of the exemplary coordinating functional groups listed above.

As described above, the first solid content (second-ligand-modified nanoparticles 24) separated out in step S3 is a precipitate. Therefore, the third organic solvent 33 is not limited in any particular manner so long as the third organic solvent 33 can dissolve or disperse the second ligands 22 and the target ligands 32 and can disperse the target-ligand-modified nanoparticles 34.

Note that when the nanoparticles 12 are, for example, QDs, the third organic solvent 33 may be, for example, a non-polar organic solvent, depending on the type of the target ligands 32. Meanwhile, when the nanoparticles 12 are, for example, carrier-transportable inorganic nanoparticles, the third organic solvent 33 may be, for example, a polar organic solvent, depending on the type of the target ligands 32.

The concentration of the target ligands 32 in the second ligand solution 31 is preferably 1 mg/mL or higher and more preferably 10 mg/mL or higher, depending on the type of the second ligands 22 and ease in coordinating the target ligands 32.

Since a higher concentration of the target ligands 32 facilitates the substitution of the target ligands 32 for the second ligands 22, the concentration is preferably as high as possible. Therefore, the concentration of the target ligands 32 has no particular upper limit, but is preferably 1500 mg/mL or lower, and more preferably 500 mg/mL or lower, with a view to, for example, the solubility of the target ligands 32 in the third organic solvent 33 or the dispersibility and manufacturing cost of the target ligands 32.

Note that the supply amount of the target ligands 32 is not limited in any particular manner and may be specified in such a suitable manner as to supply the second ligands 22, for example, in an excessive amount that exceeds the amount of the second ligands 22 that can be coordinated to the nanoparticles 12, in accordance with, for example, the type and amount of the nanoparticles 12. Since the amount of the target ligands 32 supplied is sufficient for each nanoparticle 12 regardless of the foregoing various conditions, the amount of the target ligands 32 actually coordinated to the nanoparticles 12 will likely vary depending on the concentration of the target ligands 32 contained in the second ligand solution 31. Note that the excess target ligands 32, not coordinated to the nanoparticles 12, are separated out and removed in step S5 (second separation step).

In step S4, the second ligands 22 coordinated to the nanoparticles 12 can be replaced by the target ligands 32, by mixing the second ligand solution 31 and the first solid content.

The reaction conditions such as reaction temperature and reaction time in the ligand exchange reaction (step S4) may be specified in such a suitable manner in accordance with, for example, the types and amounts of the second ligands 22, the target ligands 32, and the third organic solvent 33, as to complete the ligand exchange reaction. Therefore, the reaction conditions are not limited in any particular manner.

The ligand exchange reaction proceeds better at higher reaction temperatures. However, the ligands and nanoparticles 12 used could degrade or decompose at high reaction temperatures. In addition, at high reaction temperatures, the second organic solvent 23 could vanish depending on the boiling point of the second organic solvent 23. Therefore, the reaction temperature is preferably, for example, 100° C. or lower, and more preferably 60° C. or lower, depending on the types and amounts of the second ligands 22, the target ligands 32, and the third organic solvent 33. In addition, the ligand exchange ratio increases with a longer reaction time. However, the substitution may be substantially completed in several minutes under good reaction conditions. The substitution takes approximately no longer than 24 hours in most cases.

The target ligands 32 are supplied in an amount that is excessive to the nanoparticles 12 in step S4 as described above. Therefore, referring to FIG. 4, a reaction solution 35 after the ligand exchange contains: the third organic solvent 33; the nanoparticles 12 (target-ligand-modified nanoparticles 34) to which the target ligands 32 are coordinated; the second ligands 22 freed from the nanoparticles 12 in the ligand exchange; and the excess target ligands 32 not coordinated to the nanoparticles 12. Note that the "excess target ligands 32 not coordinated to the nanoparticles 12" refers to the free target ligands 32 that are not coordinated to the nanoparticles 12. The target-ligand-modified nanoparticles 34 are dispersed in the third organic solvent 33. In addition, the free second ligands 22 and the free target ligands 32 are dissolved or dispersed in the third organic solvent 33.

Figure 5:
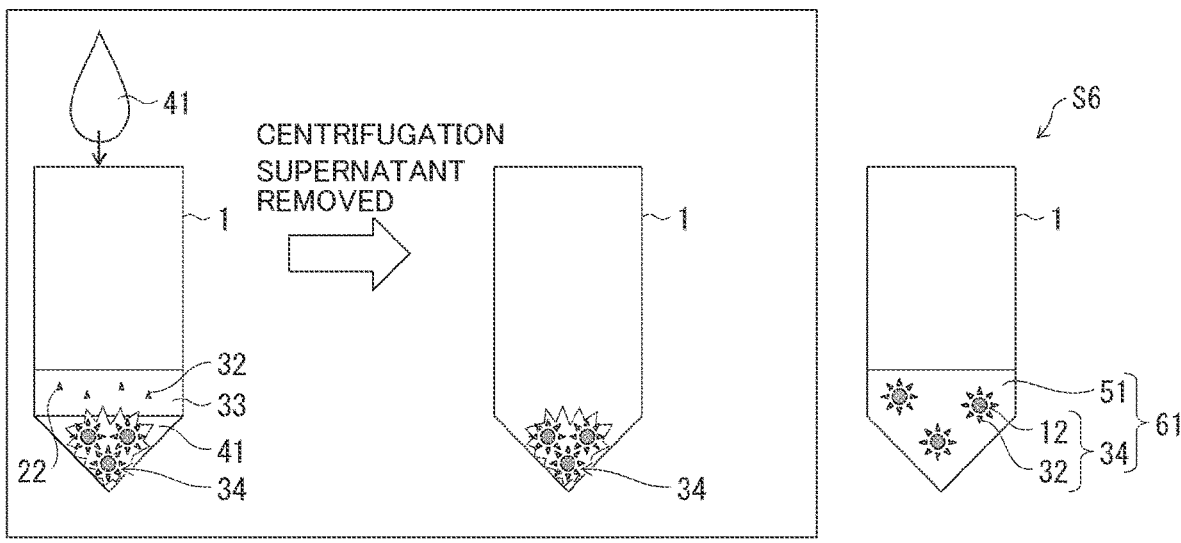
FIG. 5 is a schematic diagram of yet another part of the ligand exchange method represented in FIG. 1.

FIG. 5 is a schematic diagram of yet another part of the ligand exchange method represented in FIG. 1. FIG. 5 illustrates step S5 and step S6 shown in FIG. 1.

Referring to FIG. 5, in step S5, the nanoparticles 12 (target-ligand-modified nanoparticles 34) to which the target ligands 32 are coordinated are extracted from the reaction solution 35 obtained in the container 1 in the ligand exchange reaction in step S4 and rinsed for isolation. In step S6, these isolated target-ligand-modified nanoparticles 34 are dispersed again in the solvent by dispersing the isolated target-ligand-modified nanoparticles 34 in a fourth organic solvent 51 that is a target solvent.

Figure 6:
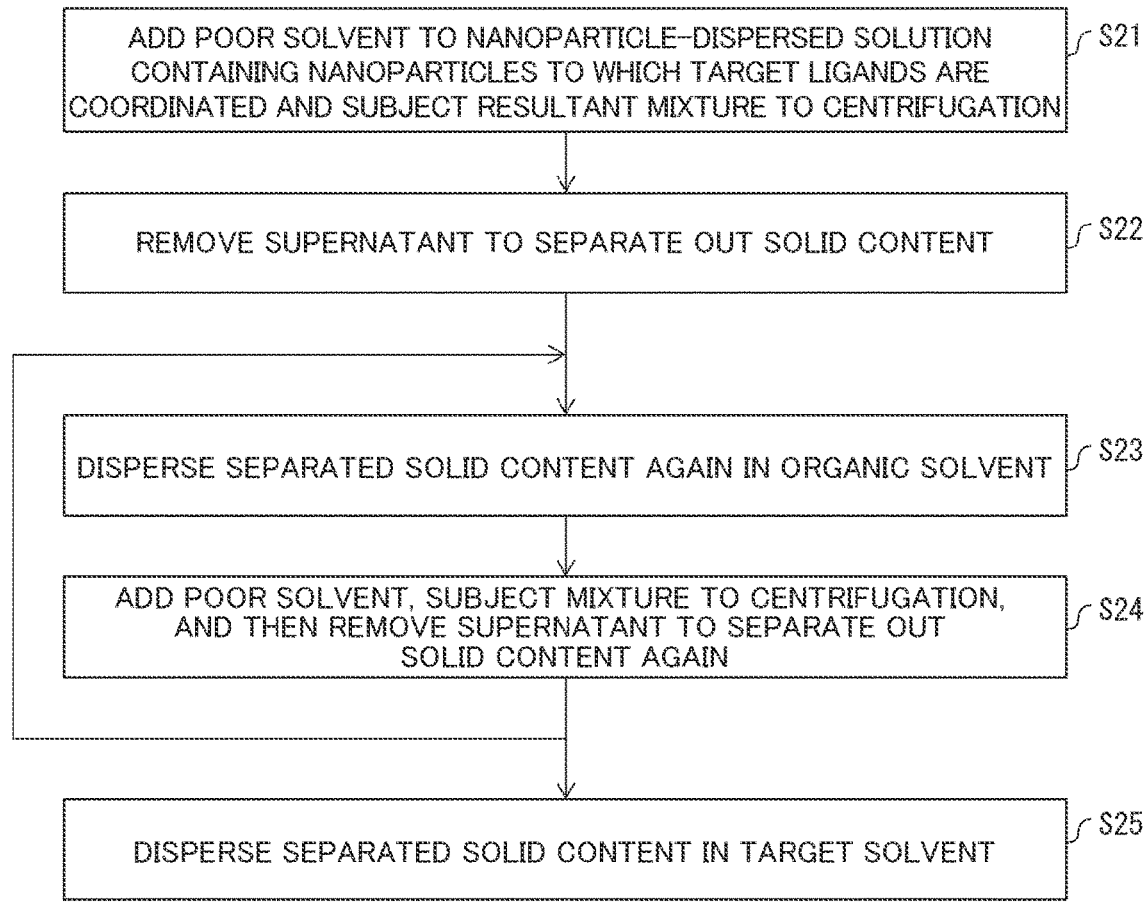
FIG. 6 is a flow chart representing, in the order of steps involved, a method of isolating the nanoparticles to which target ligands are coordinated from a nanoparticle-dispersed solution containing the nanoparticles to which target ligands are coordinated, to disperse the nanoparticles in a target solvent.

FIG. 6 is a flow chart representing, in the order of steps involved, a method of isolating the nanoparticles to which target ligands are coordinated from a nanoparticle-dispersed solution containing the nanoparticles to which the target ligands are coordinated, to disperse the nanoparticles in a target solvent.

Referring to FIG. 6, to isolate the nanoparticles to which the target ligands are coordinated from the nanoparticle-dispersed solution, typically, a poor solvent is first added to the nanoparticle-dispersed solution, and the mixture is subjected to centrifugation, thereby precipitating the nanoparticles to which the target ligands are coordinated (step S21). Next, the liquid phase (supernatant liquid) is removed to separate out a solid content (step S22). Thereafter, the nanoparticles to which the target ligands are coordinated are isolated by rinsing this solid content. This rinsing of the solid content is done by repeating more than once the re-dispersion of the separated solid content in the organic solvent (step S23) and the removal of a supernatant liquid and re-separation of a solid content (step S24) following the addition of the poor solvent and centrifugation. Then, by dispersing, in the target solvent, the solid content ultimately separated out in the rinsing (step S25), the isolated nanoparticles to which the target ligands are coordinated are dispersed in the target solvent. Note that step S25 corresponds to step S6 denoted by step S6 in FIGS. 1 and 5.

Therefore, the second separation step denoted by step S5 in FIGS. 1 and 5 (step S5) is done by, for example, the following method.

First, referring to FIGS. 5 and 6, an organic poor solvent 41 as a poor solvent is added to the reaction solution 35 obtained in the container 1 in the ligand exchange reaction in step S4, so that the nanoparticles 12 (target-ligand-modified nanoparticles 34) to which the target ligands 32 are coordinated can be deposited as a solid content (second solid content). Next, the deposited second solid content is precipitated by centrifugation (step S21).

Thereafter, by removing the liquid phase (supernatant liquid) containing: the third organic solvent 33 containing the free second ligands 22 and the free target ligands 32; and the organic poor solvent 41, the second solid content (target-ligand-modified nanoparticles 34), which is a precipitate, is separated out (step S22).

Thereafter, for example, the third organic solvent 33 as a good solvent is added again to this separated solid content (second solid content). The target-ligand-modified nanoparticles 34 and the free second ligands 22 and the free target ligands 32, not removed and remaining in the container 1, are dispersed again in the third organic solvent 33 in this manner (step S23).

Subsequently, the organic poor solvent 41 is added again to this container 1, and the mixture is subjected to centrifugation, thereby re-precipitating the target-ligand-modified nanoparticles 34 as a solid content (second solid content). Thereafter, the liquid phase (supernatant liquid) containing: the third organic solvent 33 containing the free second ligands 22 and the free target ligands 32; and the organic poor solvent 41, remaining in the container 1, is removed to again separated out the second solid content, which is a precipitate (step S24).

By repeating these steps S23 and S24 more than once, the target-ligand-modified nanoparticles 34 can be rinsed (refined). The target-ligand-modified nanoparticles 34 can be isolated in this manner.

In step S25, as denoted by step S6 in FIG. 5, the fourth organic solvent 51 as a target solvent is added to the target-ligand-modified nanoparticles 34 isolated as the second solid content, thereby dispersing the target-ligand-modified nanoparticles 34 in the fourth organic solvent 51. A target nanoparticle-dispersed solution 61 containing the target-ligand-modified nanoparticles 34 and the fourth organic solvent 51 can be manufactured in this manner.

Note that the target solvent (fourth organic solvent 51) may be any solvent in which the target-ligand-modified nanoparticles 34 are dispersible. As described above, when the nanoparticles 12 are, for example, QDs, the fourth organic solvent 51 may be, for example, a non-polar organic solvent similarly to the third organic solvent 33, depending on the type of the target ligands 32. Meanwhile, when the nanoparticles 12 are, for example, carrier-transportable inorganic nanoparticles, the fourth organic solvent 51 may be, for example, a polar organic solvent similarly to the third organic solvent 33.

Note that the first organic solvent 14, the third organic solvent 33, and the fourth organic solvent 51 may be either the same solvent or different solvents.

The concentration of the nanoparticles 12 in the target nanoparticle-dispersed solution 61 may be specified appropriately for the intended use and is not limited in any particular manner. For example, when the target nanoparticle-dispersed solution 61 is used to form a nanoparticle film by printing or coating technology, the concentration of the nanoparticles 12 in the target nanoparticle-dispersed solution 61 may be specified as in known cases, and the nanoparticles 12 need only to have such a concentration or viscosity that the nanoparticle film can be formed by printing or coating technology. For example, when the nanoparticles are QDs, and for example, a light-emitting layer is formed as a QDs film, the concentration of the nanoparticles 12 in the target nanoparticle-dispersed solution 61 is, for example, preferably from 0.1 mg/mL to 500 mg/mL, both inclusive, and more preferably from 1 mg/mL to 100 mg/mL, both inclusive, depending on the thickness of the QDs film.

Note that FIGS. 2, 4, and 5 show, as an example, the same container 1 being used in steps S2 to S6. The container 1 is not limited in any particular manner so long as the container 1 has resistance to the organic solvent used and heat resistance beyond the reaction temperature in the ligand exchange reaction and may be a container for centrifugation use (centrifugation container) such as a centrifugation tube. It should be understood however that the present embodiment is not limited to these examples. The container used in the ligand exchange reaction and the container for centrifugation use may alternatively be different containers. As another alternative, a different container may be used in each step.

Figure 7:
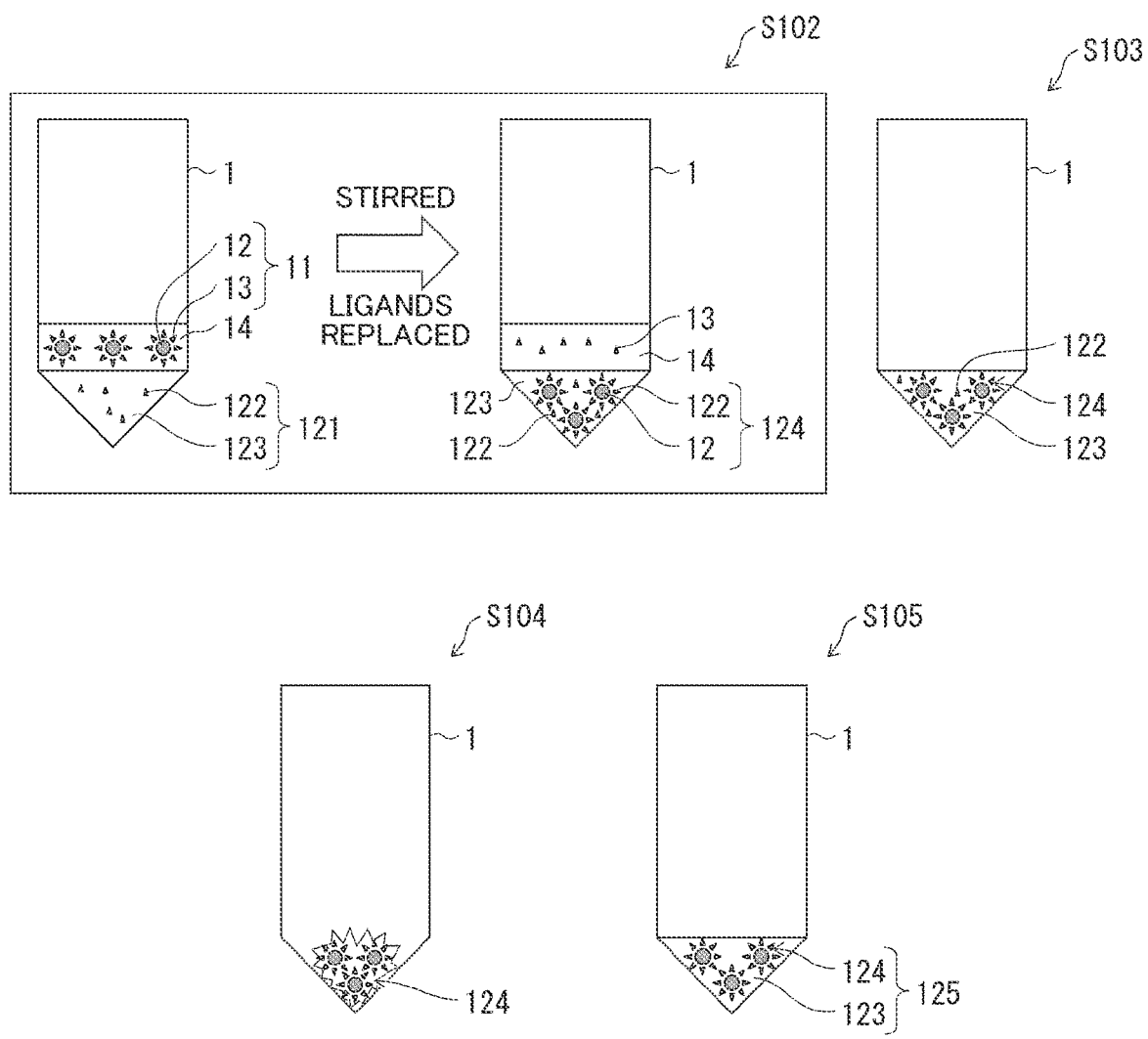
FIG. 7 is a schematic diagram of a known method of manufacturing a target nanoparticle-dispersed solution by substituting target ligands for first ligands coordinated to nanoparticles in a first nanoparticle-dispersed solution.
Figure 8:
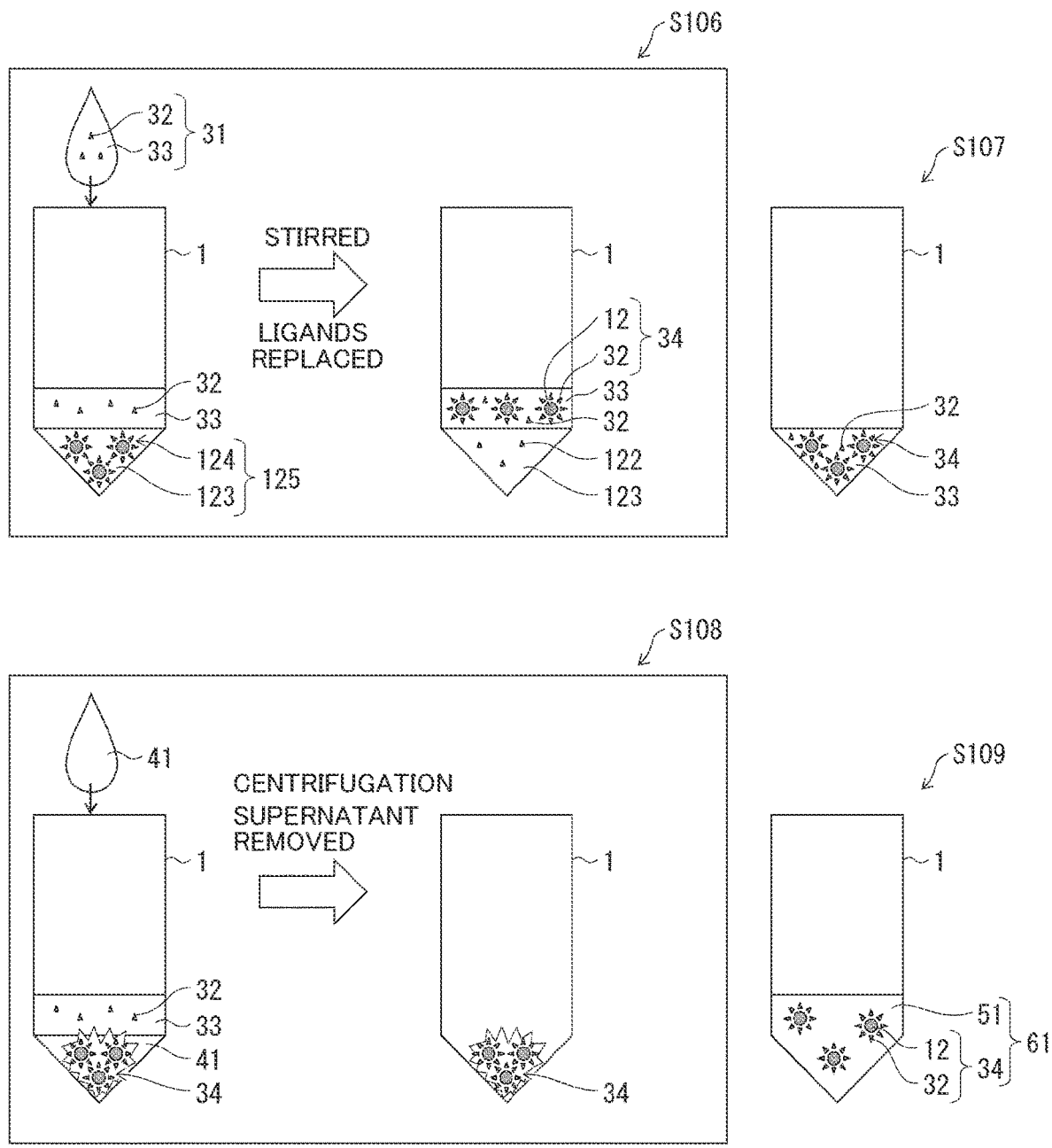
FIG. 8 is another schematic diagram of a known method of manufacturing a target nanoparticle-dispersed solution by substituting target ligands for first ligands coordinated to nanoparticles in a first nanoparticle-dispersed solution.

FIGS. 7 and 8 are schematic diagrams of a known method of manufacturing the target nanoparticle-dispersed solution 61 by substituting the target ligands 32 for the first ligands 13 coordinated to the nanoparticles 12 in the first nanoparticle-dispersed solution 11. Note that FIG. 8 illustrates steps that follow step S105 denoted by step S105 in FIG. 7.

In the known method, as denoted by step S102 in FIG. 7, an aqueous intermediate-ligand solution 121 containing aqueous-solvent-dispersible ligands 122 and an aqueous solvent 123 is mixed with the first nanoparticle-dispersed solution 11 instead of the first ligand solution 21 used in step S2. This procedure replaces the first ligands 13 with the aqueous-solvent-dispersible ligands 122 (step S102).

The first organic solvent 14 and the aqueous solvent 123 are not miscible (not compatible) to each other, and the reaction solution after the ligand exchange is separated into two phases, that is, a first organic solvent phase and an aqueous solvent phase. In step S102, an excess amount of the aqueous-solvent-dispersible ligands 122 is supplied to the nanoparticles 12. Therefore, the aqueous solvent 123, which is in the aqueous solvent phase, contains: the nanoparticles 12 to which the aqueous-solvent-dispersible ligands 122 are coordinated as intermediate ligands; and the excess aqueous-solvent-dispersible ligands 122 not coordinated to the nanoparticles 12. Note that "the excess aqueous-solvent-dispersible ligands 122 not coordinated to the nanoparticles 12" refers to the free aqueous-solvent-dispersible ligands 122 that are not coordinated to the nanoparticles 12.

Meanwhile, the first organic solvent 14, which is in the first organic solvent phase, contains the first ligands 13 that are freed from the nanoparticles 12 in the ligand exchange. Throughout the following description, the nanoparticles 12 to which the aqueous-solvent-dispersible ligands 122 are coordinated as intermediate ligands may be referred to as the "intermediate ligand-modified nanoparticles 124."

Accordingly, next, as denoted by step S103 in FIG. 7, the aqueous solvent phase containing the intermediate ligand-modified nanoparticles 124 and the free aqueous-solvent-dispersible ligands 122 is separated from the first organic solvent phase by liquid-liquid separation (step S103).

As described above, the aqueous solvent 123, which is in the aqueous solvent phase, contains the free aqueous-solvent-dispersible ligands 122 as well as the intermediate ligand-modified nanoparticles 124. Accordingly, next, as denoted by step S104 in FIG. 7, the intermediate ligand-modified nanoparticles 124 is separated (isolated) from the aqueous solvent phase (step S104).

The separation (isolation) of the intermediate ligand-modified nanoparticles 124 is performed by the same procedures as in the flow chart in FIG. 6. Specifically, a poor solvent is first added to the aqueous solvent phase (nanoparticle-dispersed solution) separated out in step S103, and the mixture is subjected to centrifugation, thereby precipitate the intermediate ligand-modified nanoparticles 124. Next, the liquid phase (supernatant liquid) is removed to separate out the intermediate ligand-modified nanoparticles 124 as a solid content. Thereafter, the solid content is rinsed by repeating more than once the re-dispersion of the separated solid content in the aqueous solvent 123 and the removal of a supernatant liquid and re-separation of a solid content following the addition of the poor solvent and centrifugation. The intermediate ligand-modified nanoparticles 124 are isolated in this manner.

Next, as denoted by step S105 in FIG. 7, the intermediate ligand-modified nanoparticles 124, isolated in step S104 described above, are dispersed in the aqueous solvent 123. A nanoparticle-dispersed solution 125 containing the intermediate ligand-modified nanoparticles 124 and the aqueous solvent 123 is obtained in this manner (step S105).

As described above, the second ligands 22 render the nanoparticles 12 non-dispersible in solvents when the second ligands 22 are coordinated to the nanoparticles 12. However, the second ligands 22 alone can dissolve or disperse in an organic solvent, as described above, to form, for example, the first ligand solution 21. Meanwhile, the aqueous-solvent-dispersible ligands 122 do not dissolve or disperse in an organic solvent, but as described above, dissolve or disperse in an aqueous solvent, as described above, to form, for example, the aqueous intermediate-ligand solution 121.

Therefore, to replace the aqueous-solvent-dispersible ligands 122 coordinated to the nanoparticles 12 with the target ligands 32, the isolated intermediate ligand-modified nanoparticles 124 need to be dispersed in the aqueous solvent 123.

Next, as denoted by step S106 in FIG. 8, the second ligand solution 31 and the intermediate ligand-modified nanoparticles 124 are mixed by, for example, adding the second ligand solution 31 containing the desirable target ligands 32 and the third organic solvent 33 to the nanoparticle-dispersed solution 125 and stirring the mixture. The aqueous-solvent-dispersible ligands 122 are replaced by the target ligands 32, and the nanoparticles 12 to which the target ligands 32 are coordinated (target-ligand-modified nanoparticles 34) are dispersed in the third organic solvent 33, in this manner (step S106).

The aqueous solvent 123 and the third organic solvent 33 are not miscible (not compatible) to each other, and the reaction solution after the ligand exchange is separated into two phases, that is, an aqueous solvent phase and a third organic solvent phase. In step S106, an excess of the target ligands 32 is supplied to the nanoparticles 12. Therefore, the third organic solvent 33, which is in the third organic solvent phase, contains: the target-ligand-modified nanoparticles 34; and the excess target ligands 32 not coordinated to the nanoparticles 12. Note that "the excess target ligands 32 not coordinated to the nanoparticles 12" refers to the free target ligands 32 that are not coordinated to the nanoparticles 12. Meanwhile, the aqueous solvent 123, which is in the aqueous solvent phase, contains the aqueous-solvent-dispersible ligands 122 freed from the nanoparticles 12 in the ligand exchange.

Accordingly, next, as denoted by step S107 in FIG. 8, the third organic solvent phase containing the target-ligand-modified nanoparticles 34 and the free target ligands 32 is separated from the aqueous solvent phase by liquid-liquid separation (step S107).

Next, as denoted by step S108 in FIG. 8, the target-ligand-modified nanoparticles 34 are extracted from the separated third organic solvent phase and rinsed for isolation (step S108).

The isolation of the target-ligand-modified nanoparticles 34 is performed by the same procedures as in the flow chart in FIG. 6. Specifically, a poor solvent is first added to the third organic solvent phase (nanoparticle-dispersed solution) separated out in step S107, and the mixture is subjected to centrifugation, thereby precipitating the target-ligand-modified nanoparticles 34. Next, the liquid phase (supernatant liquid) is removed to separate out the target-ligand-modified nanoparticles 34 as a solid content. Thereafter, the solid content is rinsed by repeating more than once the re-dispersion of the separated solid content in the third organic solvent 33 and the removal of a supernatant liquid and re-separation of a solid content following the addition of the poor solvent and centrifugation. The target-ligand-modified nanoparticles 34 are isolated in this manner.

Thereafter, the fourth organic solvent 51 as a target solvent is added to the target-ligand-modified nanoparticles 34 isolated as a solid content, to disperse the target-ligand-modified nanoparticles 34 in the fourth organic solvent 51. The target nanoparticle-dispersed solution 61 containing the target-ligand-modified nanoparticles 34 and the fourth organic solvent 51 can be manufactured in this manner (step S109). Note that step S109 is the same as steps S6 and S25 described earlier.

For instance, when the nanoparticles 12 are QDs, and the first organic solvent 14 is toluene, the aqueous-solvent-dispersible ligands 122 are, for example, diethylaminoethanethiol hydrochloride or tetramethyl ammonium hydroxide (TMAH) in the known method. The aqueous solvent 123 is, for example, water.

Meanwhile, in the present embodiment, for example, when the nanoparticles 12 are QDs, and the first organic solvent 14 is toluene, the second ligands 22 are, for example, p-toluenethiol (p-TT), and the second organic solvent 23 is, for example, methanol. In the present embodiment, as an example, the p-TT in the first ligand solution 21 has a concentration of, for example, 300 mg/mL. Note that in either case, the third organic solvent 33 is, for example, toluene.

As described in the foregoing, liquid-liquid separation is required in the known method to replace the first ligands 13 with the target ligands 32. In addition, as described above, when both the first nanoparticle-dispersed solution 11 and the target nanoparticle-dispersed solution 61 contain a non-polar solvent as a solvent, the aqueous solvent 123 is used as a solvent in the substitution of the aqueous-solvent-dispersible ligands 122 (intermediate ligands).

In contrast, the ligand exchange method in accordance with the present embodiment involves aforementioned steps S2 to S6 instead of steps S102 to S109 as described above. As described above, step S2 (first ligand exchange step) is a step in which the first ligands 13 are replaced by the second ligands 22 by mixing the first nanoparticle-dispersed solution 11 containing the nanoparticles 12, the first ligands 13, and the first organic solvent 14 with the first ligand solution 21 containing the second organic solvent 23 and the monodentate second ligands 22 that, when coordinated to the nanoparticles 12, render the nanoparticles 12 non-dispersible in solvents. Step S3 (first separation step) is a step in which the nanoparticles 12 (second-ligand-modified nanoparticles 24) to which the second ligands 22 are coordinated are separated as the first solid content from the liquid phase by solid-liquid separation. Step S4 (second ligand exchange step) is a step in which the second ligands 22 are replaced by the target ligands 32 by adding the second ligand solution 31 containing the desirable target ligands 32 and the third organic solvent 33 to the first solid content. Step S5 (second separation step) is a step in which the nanoparticles 12 (target-ligand-modified nanoparticles 34) to which the target ligands 32 are coordinated are isolated as the second solid content. Step S6 (re-dispersion step) is a step in which the target-ligand-modified nanoparticles 34 isolated in the second separation step are dispersed in the fourth organic solvent 51.

According to the present embodiment, by temporarily replacing the first ligands 13 with the second ligands 22 as intermediate ligands as described here, the second-ligand-modified nanoparticles 24 are rendered non-dispersible in solvents and hence can be separated from other solution components (liquid phase) by solid-liquid separation. Therefore, it is not necessary to replace the first ligands 13 with the target ligands 32 by replacing the first ligands 13 with the aqueous-solvent-dispersible ligands 122 as intermediate ligands and performing liquid-liquid separation using the aqueous solvent 123 as in the known method. Therefore, it is not necessary to use water (aqueous solvent) as a solvent, and the first ligands 13 can be replaced by the target ligands 32 by using only an organic solvent. Therefore, the nanoparticles 12 can be prevented from degrading in an aqueous solvent. In addition, since the nanoparticles 12 to which the second ligands 22 are coordinated can be separated out by solid-liquid separation as described above, separation is easier than when liquid-liquid separation is performed as in the known method. In addition, the two-phase separation (two layer separation) of immiscible solvents, which is needed in the known method, does not need to be considered, and application is easier. In addition, the damage to the nanoparticles 12 caused by the repeated removal of excess ligands can be restrained in comparison with when liquid-liquid separation is performed as in the known method. Therefore, according to the present embodiment, the separation step performed on the nanoparticles to which the intermediate ligands are coordinated can be simplified over known cases, thereby reducing the time taken by the separation. In addition, degradation of the nanoparticles 12 can be restrained or prevented from causing degradation of properties such as decreases in quantum yield and degradation of luminescence properties.

Note that the types of ligands coordinated to the nanoparticles 12 can be detected, for example, in an MS/MS spectrum using a TOF-SIMS (time of flight-secondary ion mass spectrometry) device to which a tandem mass spectrometer (MS/MS) is mounted. For example, through tandem mass spectrometry of nanoparticle-containing films obtained by drying the nanoparticle-dispersed solutions described above using, for example, the TOF-SIMS device, it is possible to analyze the structure of molecules in the nanoscale thin film samples and to identify the molecular structure of ligands contained in the nanoparticle-containing films with high precision.

In addition, the replacement of the first ligands 13 coordinated to the nanoparticles 12 with the second ligands 22 can be confirmed by the nanoparticles 12 to which the second ligands 22 are coordinated failing to disperse in any solvent, but being deposited and precipitated. In addition, the replacement of the second ligands 22 coordinated to the nanoparticles 12 with the target ligands 32 can be confirmed by the nanoparticles 12 to which the target ligands 32 are coordinated being dispersed in the third organic solvent 33.

In addition, depending on the ligands to be coordinated, whether or not the ligands are coordinated can be verified, for example, by measurement by Fourier transform infrared spectroscopy (FT-IR) (hereinafter, "FT-IR measurement"). For example, when the ligands to be coordinated to the nanoparticles 12 have, for example, a carboxy group (—COOH group), an amino group (—NH$_2$group), or a —PO group contained in a phosphonic group, the vibration observed in FT-IR measurements slightly differs between a condition where the ligands are not coordinated and a condition where the ligands are coordinated, which causes a shift of the detected peak. This approach can hence verify the coordination of the ligands to the nanoparticles 12 or the replacement of the ligands coordinated to the nanoparticles 12.

In addition, the coordination of the substituting ligands to the nanoparticles can be confirmed by the peak produced by the unreplaced ligands (original, pre-substitution ligands) vanishing after the ligand exchange and being replaced only by the replacing ligands (substituting ligands).

Furthermore, when either one or both of the original, pre-substitution ligands and the substituting ligands have a functional group that shows a distinct peak other than the coordinating functional group coordinated to the nanoparticles 12, it is also possible to verify the coordination through the detected amount thereof. Examples of such a functional group include an ether group, an ester group, and a C═C bond in oleic acid. Especially, when the distinct peak existent prior to the ligand exchange has vanished in the ligand exchange or when a new distinct peak is detected after the ligand exchange, the ligand exchange can be verified.

FT-IR is capable of measurement for each functional group and also capable of not only confirming that the coordination has occurred and that the ligand exchange has occurred as described above, but also roughly determining the substitution ratio, by comparing detected peaks. Note that when the second ligands 22 are p-toluenethiol as described above, and p-toluenethiol is coordinated, large absorption is observable at wave numbers of 1500 nm$^{-1}$ and 800 nm$^{-1}$.

In addition, as described above, in step S3 described above (first separation step), for example, the nanoparticles 12 to which the second ligands 22 are coordinated are precipitated to form a precipitate. Then, the precipitate, which is the first solid content, is solid-liquid-separated by removing, as the liquid phase, a supernatant liquid containing: the first organic solvent 14 containing the first ligands 13; and the second organic solvent 23 containing the excess second ligands 22 not coordinated to the nanoparticles 12.

According to the present embodiment, as described here, the phase separation from the supernatant liquid is possible by replacing the first ligands 13 with the second ligands 22 to precipitate the nanoparticles 12 to which the second ligands 22 are coordinated. Therefore, the supernatant liquid can be readily removed and solid-liquid-separated by, for example, decantation. Note that the solid-liquid separation may be done by, for example, filtering.

The present disclosure is not limited to the description of the embodiments above and may be altered within the scope of the claims. Embodiments based on a proper combination of technical means disclosed in different embodiments are encompassed in the technical scope of the present disclosure. Furthermore, new technological features can be created by combining different technical means disclosed in the embodiments.

The invention claimed is:

1. A method of substituting ligands, the method comprising:
   a first ligand exchange step of replacing first ligands with second ligands by mixing a first nanoparticle-dispersed solution containing nanoparticles, the first ligands, and a first organic solvent with a first ligand solution containing a second organic solvent and the monodentate, second ligands that, by being coordinated to the nanoparticles, render the nanoparticles non-dispersible in a solvent;
   a first separation step of separating, as a first solid content, the nanoparticles to which the second ligands are coordinated from a liquid phase by solid-liquid separation;
   a second ligand exchange step of replacing the second ligands with desirable target ligands by adding a second ligand solution containing the target ligands and a third organic solvent to the first solid content;
   a second separation step of isolating, as a second solid content, the nanoparticles to which the target ligands are coordinated; and
   a re-dispersion step of dispersing, in a fourth organic solvent, the nanoparticles to which the target ligands are coordinated and that are isolated in the second separation step.

2. The method of substituting ligands according to claim 1, wherein
   the second ligands have one coordinating functional group to be coordinated to the nanoparticles, and
   the second ligands have a $C_1$-$C_8$ main chain backbone that is, when the second ligands contain no ring, a carbon chain with a maximum number of carbons that links a carbon to which the coordinating functional group is bonded to a carbon located in a terminal group by a minimum distance and when the second ligands contain a ring, either one of carbon chains (i) and (ii) that contains more carbons than another, the carbon chain (i) being a carbon chain linking a carbon to which the coordinating functional group is bonded to a carbon located on the ring in an opposite position from a carbon bonded to the coordinating functional group or a substituent containing the coordinating functional group by a minimum distance along the ring, the carbon chain (ii) being, when a substituent other than the coordinating functional group or a substituent containing the coordinating functional group is bonded to the ring, a carbon chain with a maximum number of carbons among carbon chains linking a carbon to which the coordinating functional group is bonded to a terminal carbon of the substituent, bonded to the ring, other than the coordinating functional group or the substituent containing the coordinating functional group by a minimum distance along the ring.

3. The method of substituting ligands according to claim 2, wherein the main chain backbone of the second ligands contains 5 or fewer carbons.

4. The method of substituting ligands according to claim 1, wherein the second ligands are at least one species of ligands selected from the group consisting of ethyl mercaptan, 1-propanethiol, 1-butanethiol, 1-pentanethiol, 2-methyl-1-butanethiol, o-toluenethiol, m-toluenethiol, p-toluenethiol, 2,4-dimethylbenzenethiol, 3,4-dimethylbenzenethiol, 2,5-dimethylbenzenethiol, 3,5-dimethylbenzenethiol, 3-methylcyclopentanethiol, 4-tert-butylbenzenethiol, 4-isopropylbenzenethiol, methylamine, pentylamine, p-toluidine, 4-phenylbutylamine, pentanoic acid, benzoic acid, ethylphosphonate, and trimethylphosphine.

5. The method of substituting ligands according to claim 1, wherein the second ligands are p-toluenethiol.

6. The method of substituting ligands according to claim 1, wherein
   the nanoparticles are quantum dots,
   the first organic solvent is a non-polar organic solvent, and
   the second organic solvent is a polar organic solvent.

7. The method of substituting ligands according to claim 6, wherein the non-polar organic solvent has a permittivity of from 1.8 to 6.1, both inclusive.

8. The method of substituting ligands according to claim 6, wherein the polar organic solvent has a permittivity of from 6.1 exclusive to 50 inclusive.

9. The method of substituting ligands according to claim 1, wherein
   the nanoparticles are carrier-transportable inorganic nanoparticles,
   the first organic solvent is a polar organic solvent, and
   the second organic solvent is a non-polar organic solvent.

10. The method of substituting ligands according to claim 1, further including, before the first ligand exchange step, a dilution step of diluting the first nanoparticle-dispersed solution with the first organic solvent so that the nanoparticles has a concentration of from 0.001 mg/mL to 100 mg/mL, both inclusive, in the first nanoparticle-dispersed solution.

11. The method of substituting ligands according to claim 10, wherein in the dilution step, the first nanoparticle-dispersed solution is diluted with the first organic solvent so that the concentration of the nanoparticles in the first nanoparticle-dispersed solution is from 0.01 mg/mL to 20 mg/mL, both inclusive.

12. The method of substituting ligands according to claim 1, wherein in the first separation step,
   the nanoparticles to which the second ligands are coordinated are precipitated to form a precipitate, and
   the precipitate, which is the first solid content, is solid-liquid-separated by removing, as the liquid phase, a supernatant liquid containing: the first organic solvent containing the first ligands; and the second organic solvent containing an excess of the second ligands that is not coordinated to the nanoparticles.

13. The method of substituting ligands according to claim 1, wherein in the second separation step, the nanoparticles to which the target ligands are coordinated are deposited in an organic poor solvent and refined for isolation as the second solid content.

* * * * *